US012806610B2

(12) United States Patent
Akita et al.

(10) Patent No.: US 12,806,610 B2
(45) Date of Patent: Nov. 24, 2026

(54) EXHAUST GAS PURIFICATION CATALYST

(71) Applicant: MITSUI MINING & SMELTING CO., LTD., Tokyo (JP)

(72) Inventors: Shingo Akita, Saitama (JP); Hiroki Kurihara, Saitama (JP)

(73) Assignee: Mitsui Kinzoku Company, Limited, Tokyo (JP)

( * ) Notice: Subject to any disclaimer, the term of this patent is extended or adjusted under 35 U.S.C. 154(b) by 406 days.

(21) Appl. No.: 18/691,275

(22) PCT Filed: Sep. 5, 2022

(86) PCT No.: PCT/JP2022/033325

§ 371 (c)(1),
(2) Date: Mar. 12, 2024

(87) PCT Pub. No.: WO2023/047933

PCT Pub. Date: Mar. 30, 2023

(65) Prior Publication Data

US 2024/0382942 A1 Nov. 21, 2024

(30) Foreign Application Priority Data

Sep. 22, 2021 (JP) ................................ 2021-154787

(51) Int. Cl.
*B01J 35/00* (2024.01)
*B01D 53/94* (2006.01)
(Continued)

(52) U.S. Cl.
CPC .............. *B01J 35/19* (2024.01); *B01D 53/94* (2013.01); *B01J 23/10* (2013.01); *B01J 23/63* (2013.01);
(Continued)

(58) Field of Classification Search
CPC ... B01J 35/19; B01J 35/56; B01J 23/10; B01J 23/53; B01J 37/0018; B01J 37/0228;
(Continued)

(56) References Cited

U.S. PATENT DOCUMENTS 10,125,649 B2 11/2018 Onoe et al.
2011/0123421 A1 5/2011 Grubert
(Continued)

FOREIGN PATENT DOCUMENTS

CN 107073465 A 8/2017
CN 112004599 A 11/2020
(Continued)

OTHER PUBLICATIONS

International Search Report (ISR) dated Nov. 1, 2022 filed in PCT/JP2022/033325.

*Primary Examiner* — Richard M Rump
(74) *Attorney, Agent, or Firm* — RANKIN, HILL & CLARK LLP

(57) ABSTRACT

An object of the present invention is to provide an exhaust gas purification catalyst including a wall-flow type substrate and a catalyst portion, the exhaust gas purification catalyst being capable of achieving an improvement of PM collecting performance and suppression of an increase in pressure loss, and the present invention provides an exhaust gas purification catalyst (1) including a substrate (10) extending in an exhaust gas flow direction (E), and at least one of a first catalyst portion (20) and a second catalyst portion (30) each provided on the substrate (10), wherein the first catalyst portion (20) satisfies the following expressions (11) and (12):

(Continued)

$$0.20 \leq R_{11} \leq 0.80 \quad (11)$$

$$0.30 \leq R_{12} \leq 0.85, \quad (12)$$

and wherein the second catalyst portion (30) satisfies the following expressions (21) and (22):

$$0.20 \leq R_{21} \leq 0.80 \quad (21)$$

$$0.30 \leq R_{22} \leq 0.85. \quad (22)$$

5 Claims, 17 Drawing Sheets

(51) Int. Cl.

| | |
|---|---|
| ***B01J 23/10*** | (2006.01) |
| ***B01J 23/63*** | (2006.01) |
| ***B01J 35/56*** | (2024.01) |
| ***B01J 37/00*** | (2006.01) |
| ***B01J 37/02*** | (2006.01) |
| ***B01J 37/08*** | (2006.01) |
| ***F01N 3/28*** | (2006.01) |

(52) U.S. Cl.

CPC ........... *B01J 35/56* (2024.01); *B01J 37/0018* (2013.01); *B01J 37/0228* (2013.01); *B01J 37/0236* (2013.01); *B01J 37/08* (2013.01); *F01N 3/2803* (2013.01); *B01D 2255/1021* (2013.01); *B01D 2255/1025* (2013.01); *B01D 2255/9022* (2013.01); *B01D 2255/908* (2013.01); *B01D 2255/9155* (2013.01); *B01D 2258/01* (2013.01); *F01N 2370/02* (2013.01)

(58) Field of Classification Search

CPC ....... B01J 37/0236; B01J 37/08; B01D 53/94; B01D 2255/1023; B01D 2255/1025; B01D 2255/9022; B01D 2255/908; B01D 2255/9155; B01D 2258/01; F01N 3/2803; F01N 2370/02

See application file for complete search history.

(56) References Cited

U.S. PATENT DOCUMENTS

| | | | |
|---|---|---|---|
| 2017/0306823 | A1 | 10/2017 | Onoe et al. |
| 2018/0021726 | A1 | 1/2018 | Onoe et al. |
| 2018/0119589 | A1 | 5/2018 | Chandler et al. |
| 2018/0298800 | A1 | 10/2018 | Clowes et al. |
| 2021/0164377 | A1 | 6/2021 | Kurihara et al. |
| 2022/0168710 | A1 | 6/2022 | Nagai et al. |
| 2022/0184591 | A1 | 6/2022 | Onoe et al. |
| 2022/0316372 | A1 | 10/2022 | Tasaki et al. |
| 2022/0401939 | A1 | 12/2022 | Nagai et al. |
| 2023/0029275 | A1 | 1/2023 | Nagai et al. |

FOREIGN PATENT DOCUMENTS

| | | | | |
|---|---|---|---|---|
| CN | 113164945 | A | | 7/2021 |
| JP | 2015147202 | A | * | 8/2015 |
| JP | 2016150305 | A | | 8/2016 |
| JP | 2018537265 | A | | 12/2018 |
| WO | 2020255687 | A1 | | 12/2020 |
| WO | 2020262623 | A1 | | 12/2020 |
| WO | 2021125256 | A1 | | 6/2021 |
| WO | 2021181487 | A1 | | 9/2021 |

* cited by examiner

EXHAUST GAS PURIFICATION CATALYST

FIELD OF THE INVENTION

The present invention relates to an exhaust gas purification catalyst.

BACKGROUND ART

Exhaust gas discharged from an internal combustion engine of an automobile, a motorcycle or the like contains harmful components such as hydrocarbons (HC), carbon monoxide (CO) and nitrogen oxide (NOX). A three-way catalyst is used to purify and detoxify those harmful components. A catalyst containing noble metal elements such as platinum element (Pt), palladium element (Pd) and rhodium element (Rh) is used as a three-way catalyst. Pt and Pd are mainly involved in oxidative purification of HC and CO and Rh is mainly involved in reductive purification of NOx.

In addition to harmful components such as HC, CO and NOx, exhaust gas contains particulate matter (PM), which is known as causing air pollution.

To respond to an environmental regulation on PM, a vehicle equipped with a gasoline engine such as a gasoline direct injection engine (GDI) is also required to be installed with a filter with a PM collecting function (GPF: Gasoline Particulate Filter) as in a vehicle equipped with a diesel engine.

A substrate having a structure called a wall-flow type is used as a GPF. The wall-flow type substrate includes: an inflow-side cell having an open end on the exhaust gas inflow side and a closed end on the exhaust gas outflow side; an outflow-side cell having an open end on the exhaust gas outflow side and a closed end on the exhaust gas inflow side; and a porous partition wall separating the inflow-side cell and the outflow-side cell. When the exhaust gas that has flowed into the wall-flow type substrate from the end (opening) on the exhaust gas inflow side of the inflow-side cell passes through the porous partition wall and flows out from the end (opening) on the exhaust gas outflow side of the outflow-side cell, PM in the exhaust gas is trapped in the pores inside the partition wall.

Since space for installing an exhaust gas purification catalyst is usually limited, technologies for collecting PM and purifying harmful components such as HC, CO, and NOx by forming a catalyst portion containing a noble metal element such as Pt, Pd or Rh on a wall-flow type substrate have been studied.

For example, Patent Document 1 discloses an exhaust gas purification catalyst including a wall-flow type substrate and a catalyst portion formed inside a partition wall of the wall-flow type substrate.

Patent Document 2 discloses an exhaust gas purification catalyst including a wall-flow type substrate and a catalyst portion formed on an outer surface of the partition wall.

CITATION LIST

Patent Documents

Patent Document 1: Japanese Unexamined Patent Application Publication No. 2016-150305

Patent Document 2: Japanese Unexamined Patent Application Publication No. 2018-537265

SUMMARY OF THE INVENTION

When a catalyst portion is formed inside a partition wall of a wall-flow type substrate as in Patent Document 1, large pores of the partition wall cannot be moderately embedded, which may result in a reduction in PM collecting performance. On the other hand, in the case where a catalyst portion is provided on an outer surface of a partition wall of a wall-flow type substrate as in Patent Document 2, PM collecting performance can be improved by embedding pores of the outer surface of the partition wall. However, to achieve this, the catalyst portion is required to be provided at a high amount of coating. When a catalyst portion is provided at a high amount of coating, an increase in pressure loss is noticeable.

Thus, an object of the present invention is to provide an exhaust gas purification catalyst including a wall-flow type substrate and a catalyst portion, the exhaust gas purification catalyst being capable of achieving an improvement of the PM collecting performance and suppression of an increase in pressure loss.

To solve the above-mentioned problem, the present invention provides the following exhaust gas purification catalysts.

[1] An exhaust gas purification catalyst comprising:

a substrate extending in an exhaust gas flow direction; and at least one of a first catalyst portion and a second catalyst portion each provided on the substrate, wherein the substrate comprises:

an inflow-side cell extending in the exhaust gas flow direction and having an open end on an exhaust gas inflow side thereof and a closed end on an exhaust gas outflow side thereof;

an outflow-side cell extending in the exhaust gas flow direction and having a closed end on an exhaust gas inflow side thereof and an open end on an exhaust gas outflow side thereof; and a porous partition wall separating the inflow-side cell and the outflow-side cell from each another, wherein the first catalyst portion is formed on a predetermined region of a surface on an inflow-side cell side of the partition wall, the predetermined region extending from an end on an exhaust gas inflow side of the partition wall along the exhaust gas flow direction, wherein the second catalyst portion is formed on a predetermined region of a surface on an outflow-side cell side of the partition wall, the predetermined region extending from an end on an exhaust gas outflow side of the partition wall along a direction opposite to the exhaust gas flow direction, wherein part of the predetermined region of the surface on the inflow-side cell side is covered with the first catalyst portion, whereas remaining part of the predetermined region of the surface on the inflow-side cell side is exposed without being covered with the first catalyst portion, whereby the surface of the first catalyst portion and the remaining part of the predetermined region together form a first uneven surface, wherein part of the predetermined region of the surface on the outflow-side cell side is covered with the second catalyst portion, whereas remaining part of the predetermined region of the surface on the outflow-side cell side is exposed without being covered with the second catalyst portion, whereby the surface of the second catalyst portion and the remaining part of the predetermined region together form a second uneven surface, wherein the first catalyst portion satisfies the following expressions (11) and (12):

$$0.20 \leq R_{11} \leq 0.80 \quad (11)$$

$$0.30 \leq R_{12} \leq 0.85 \quad (12)$$

wherein $R_{11}$ represents a ratio of an area of the part covered with the first catalyst portion to an area of the predetermined region of the surface on the inflow-side cell side, and $R_{12}$ represents a ratio of a surface roughness of the first uneven surface to a surface roughness of the predetermined region of the surface on the inflow-side cell side, and wherein the second catalyst portion satisfies the following expressions (21) and (22):

$$0.20 \leq R_{21} \leq 0.80 \quad (21)$$

$$0.30 \leq R_{22} \leq 0.85 \quad (22)$$

wherein $R_{21}$ represents a ratio of an area of the part covered with the second catalyst portion to an area of the predetermined region of the surface on the outflow-side cell side, and $R_{22}$ represents a ratio of a surface roughness of the second uneven surface to a surface roughness of the predetermined region of the surface on the outflow-side cell side.

[2] The exhaust gas purification catalyst according to [1], wherein the first catalyst portion satisfies the following expression (13):

$$0.060 \leq R_{13} \leq 0.55 \quad (13)$$

wherein $R_{13}$ represents a value obtained by multiplying $R_{11}$ by $R_{12}$, and $R_{11}$ and $R_{12}$ have the same meanings as above, and wherein the second catalyst portion satisfies the following expression (23):

$$0.060 \leq R_{23} \leq 0.55 \quad (23)$$

wherein $R_{23}$ represents a value obtained by multiplying $R_{21}$ by $R_{22}$, and $R_{21}$ and $R_{22}$ have the same meanings as above.

[3] The exhaust gas purification catalyst according to [1] or [2], wherein the exhaust gas purification catalyst comprises both the first catalyst portion and the second catalyst portion.

[4] The exhaust gas purification catalyst according to any one of [1] to [3], wherein a ratio of a total length of a length of the predetermined region of the surface on the inflow-side cell side and a length of the predetermined region of the surface on the outflow-side cell side to a length of the substrate is 0.30 or more and 1.8 or less.

[5] The exhaust gas purification catalyst according to any one of [1] to [4], wherein the first catalyst portion and the second catalyst portion each independently comprise at least one catalytically-active component selected from platinum element (Pt), palladium element (Pd) and rhodium element (Rh).

According to the present invention, an exhaust gas purification catalyst capable of achieving an improvement of PM collecting performance and suppression of an increase in pressure loss is provided.

DETAILED DESCRIPTION OF THE INVENTION

Embodiments of the exhaust gas purification catalyst according to the present invention will now be described with reference to drawings.

Figure 1:
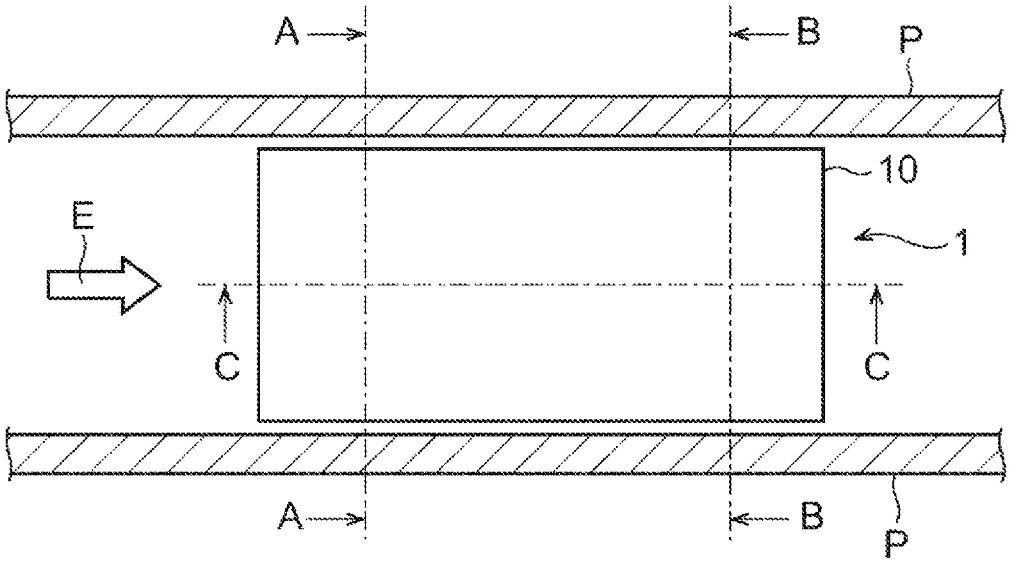
FIG. 1 is a partial cross-sectional view showing a state in which an exhaust gas purification catalyst according to one embodiment of the present invention is disposed in an exhaust gas path of an internal combustion engine.
Figure 2:
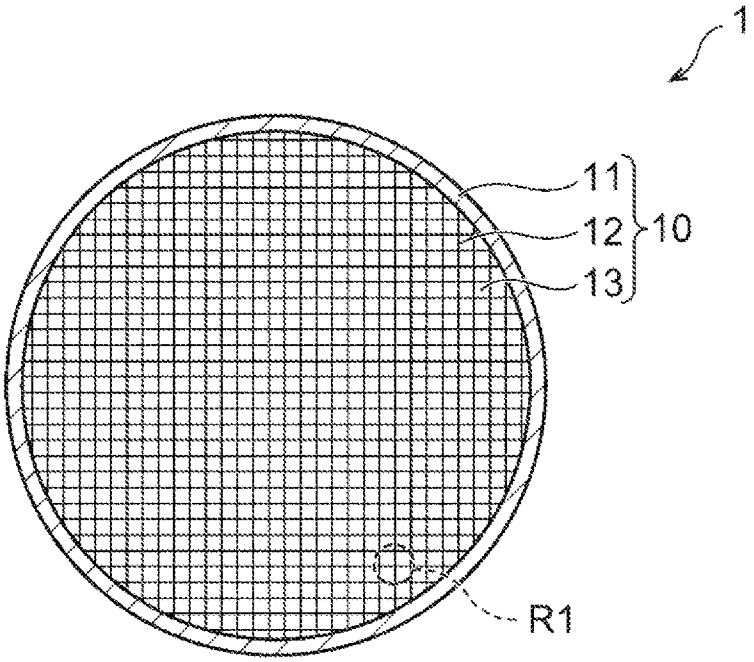
FIG. 2 is an end view taken along line A-A of FIG. 1.
Figure 3:
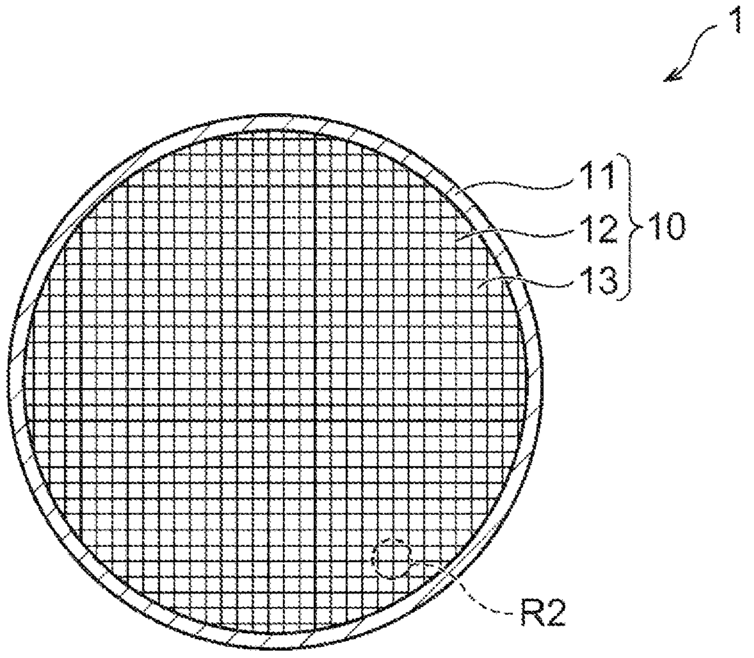
FIG. 3 is an end view taken along line B-B of FIG. 1.

As shown in FIG. 1, the exhaust gas purification catalyst 1 is disposed in an exhaust gas path in an exhaust pipe P of an internal combustion engine. The internal combustion engine is, for example, a gasoline engine (e.g., GDI engine), a diesel engine or the like.

In FIG. 1, the exhaust gas flow direction is denoted by the reference sign E. The same applies to other figures. The upstream position in the exhaust gas flow direction E (e.g., the left side in FIG. 1) is referred to as the "exhaust gas inflow side," and the downstream position in the exhaust gas flow direction E (e.g., the right side in FIG. 1) is referred to as the "exhaust gas outflow side," in some cases.

As shown in FIG. 1, the exhaust gas purification catalyst 1 is disposed in the exhaust gas path of the internal combustion engine such that the axial direction of a substrate 10 roughly coincides with the exhaust gas flow direction E. In the present specification, the "length" refers to the dimension in the axial direction of a substrate 10, unless otherwise defined.

As shown in FIGS. 1 to 7, the exhaust gas purification catalyst 1 includes: a substrate 10 extending in the exhaust gas flow direction E; a first catalyst portion 20 provided on the substrate 10; and a second catalyst portion 30 provided on the substrate 10.

The exhaust gas purification catalyst 1 is only required to include at least one of the first catalyst portion 20 and the second catalyst portion 30. Therefore, an embodiment in which either one of the first catalyst portion 20 and the second catalyst portion 30 is omitted is also included in the present invention. However, from the viewpoint of improving the exhaust gas purification performance and the PM collecting performance, the exhaust gas purification catalyst 1 preferably includes both the first catalyst portion 20 and the second catalyst portion 30.

«Substrate»

Hereinafter, the substrate 10 will be described.

The material constituting the substrate 10 can be selected as appropriate. Examples of the material constituting the substrate 10 include a ceramic material and a metal material. The ceramic material is preferable. Examples of the ceramic material include carbide ceramics such as silicon carbide, titanium carbide, tantalum carbide, and tungsten carbide; nitride ceramics such as aluminum nitride, silicon nitride, boron nitride, and titanium nitride; oxide ceramics such as alumina, zirconia, cordierite, mullite, zircon, aluminum titanate, and magnesium titanate; and silicon-containing silicon carbides. The ceramic material is preferably a silicon-containing ceramic material such as silicon carbide, silicon nitride, cordierite, or mullite. The ceramic material may be used alone or in combination of two or more thereof.

As shown in FIGS. 2 to 8, the substrate 10 includes: a tubular member 11; a partition wall 12 provided in the tubular member 11; and cells 13 (cells 13*a* and 13*b*) separated from each other by the partition wall 12.

The axial direction of the substrate 10 coincides with the axial direction of the tubular member 11. In the present embodiment, the tubular member 11 has a hollow cylindrical shape, but may have another tubular shape such as a hollow elliptic cylindrical shape, a polygonal tubular shape or the like.

As shown in FIGS. 2 to 8, the partition wall 12 is present between adjacent cells 13 (cells 13*a* and 13*b*), whereby the adjacent cells 13 (cells 13*a* and 13*b*) are separated from each other by the partition wall 12.

As shown in FIGS. 2 to 8, cells 13 (cells 13*a* and 13*b*) each extend in the exhaust gas flow direction E and has an end on the exhaust gas inflow side and an end on the exhaust gas outflow side.

Figure 6:
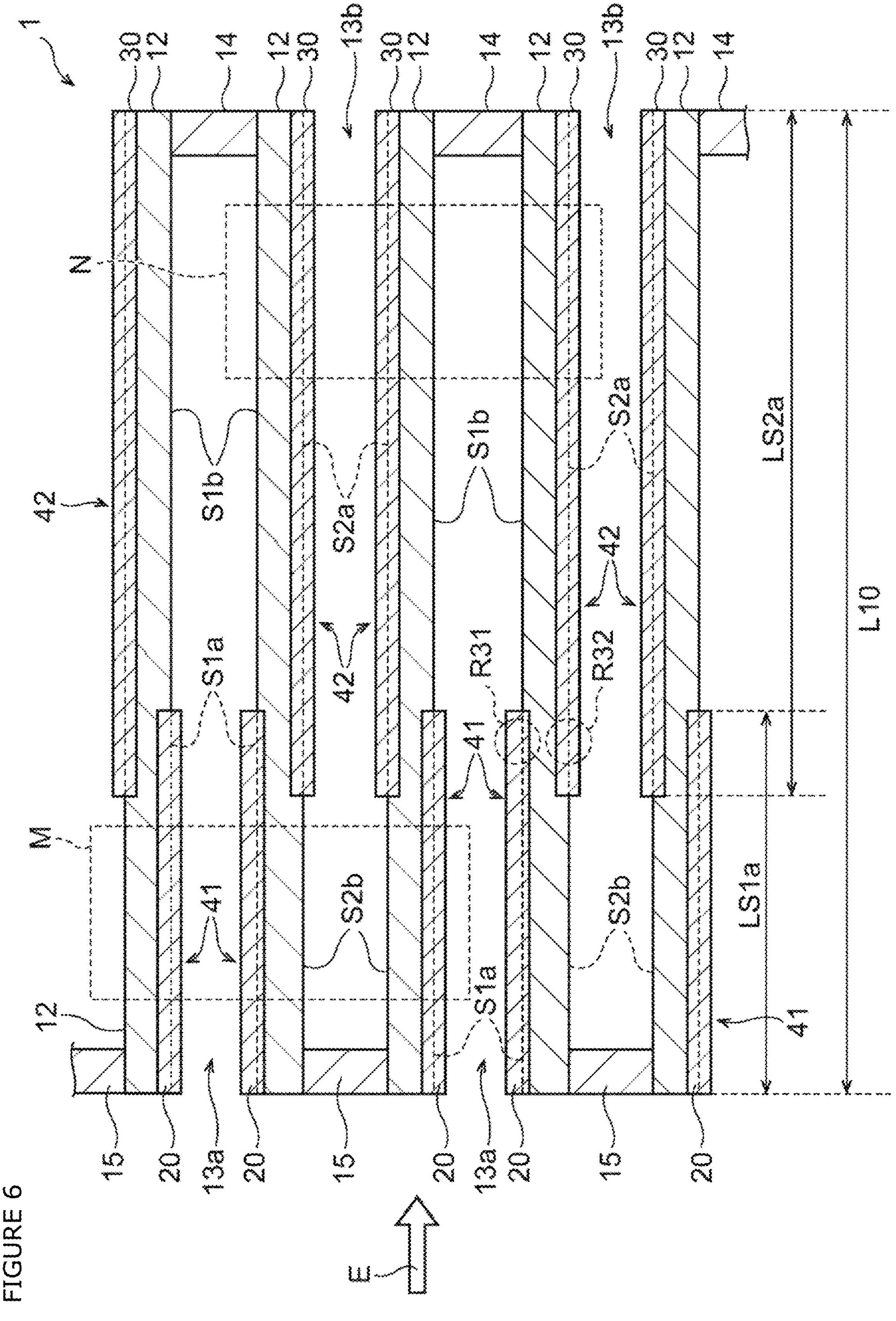
FIG. 6 is an end view taken along line C-C of FIG. 1.

As shown in FIG. 6, the substrate 10 is provided with a first sealing member 14 that seals the ends of some of the cells 13 on the exhaust gas outflow side and a second sealing member 15 that seals the ends of the remaining cells 13 on the exhaust gas inflow side, so that some of the cells 13 are each an inflow-side cell 13*a* in which the end on the exhaust gas inflow side is open and the end on the exhaust gas outflow side is closed by the first sealing member 14, and the remaining cells 13 are each an outflow-side cell 13*b* in which the end on the exhaust gas inflow side is closed by the second sealing member 15 and the end on the exhaust gas outflow side is open.

As shown in FIGS. 4 to 6 and 8, a plurality of (four in the present embodiment) outflow-side cells 13*b* are arranged around one inflow-side cell 13*a*, and the inflow-side cell 13*a* and the outflow-side cells 13*b* arranged around the inflow-side cell 13*a* are separated from one another by the porous partition wall 12.

Exhaust gas emitted from the internal combustion engine flows through the exhaust gas path in the exhaust gas pipe P from one end to the other end of the exhaust gas pipe P, and is purified by the exhaust gas purification catalyst 1 provided in the exhaust pipe P. In this case, the exhaust gas that has flowed in from the end (opening) on the exhaust gas inflow side of the inflow-side cell 13*a* passes through the porous partition wall 12 and flows out from the end (opening) on the exhaust gas outflow side of the outflow-side cell 13*b*. Such a mode is called a wall-flow type.

In the exhaust gas purification catalyst 1, when the exhaust gas that has flowed in from the end (opening) on the exhaust gas inflow side of the inflow-side cell 13*a* passes through the porous partition wall 12, particulate matter (PM) in the exhaust gas is collected in the pores of the partition wall 12, the pores of the first catalyst portion 20 and the pores of the second catalyst portion 20. Therefore, the exhaust gas purification catalyst 1 is useful as a particulate filter for a gasoline engine or as a diesel particulate filter for a diesel engine.

In the present embodiment, the shape in a plan view of the end (opening) on the exhaust gas inflow side of the inflow-side cell 13*a* is rectangle, but may be another shape such as hexagon, octagon or the like. The same applies to the end (opening) on the exhaust gas outflow side of the outflow-side cell 13*b*.

The cell density per square inch of the substrate 10 can be adjusted as appropriate, and is preferably 200 cells or more and 350 cells or less, from the viewpoint of more effectively achieving the improvement of the PM collecting performance and the suppression of the increase in pressure loss. The cell density per square inch of the substrate 10 is the total number of cells 13*a* and 13*b* per square inch in a cross section obtained by cutting the substrate 10 in a plane perpendicular to the axial direction of the substrate 10.

The partition wall 12 has a porous structure allowing exhaust gas to pass through. The thickness of the partition wall 12 can be adjusted as appropriate, and is preferably 150 μm or more and 350 μm or less, and more preferably 180 μm or more and 320 μm or less, from the viewpoint of more effectively achieving the improvement of the PM collecting performance and the suppression of the increase in pressure loss. The average pore diameter (average void diameter) of the partition wall 12 can be adjusted as appropriate, and is preferably 12 μm or more and 25 μm or less, and more preferably 13 μm or more and 22 μm or less, from the viewpoint of more effectively achieving the improvement of the PM collecting performance and the suppression of the increase in pressure loss. The porosity (void content) of the partition wall 12 can be adjusted as appropriate, and is for example, 40% or more and 80% or less, preferably 45% or more and 75% or less, more preferably 50% or more and 75% or less, and still more preferably 60% or more and 70% or less, from the viewpoint of more effectively achieving the suppression of the increase in pressure loss.

The average pore diameter and porosity of the partition wall 12 can be measured by mercury porosimetry using a mercury porosimeter. In the mercury porosimetry, a test piece cut out from the substrate 10 (containing neither first sealing member 14 nor second sealing member 15) is stored in the measurement cell of the mercury porosimeter, the pressure inside the measurement cell is reduced, mercury is introduced into the measurement cell, pressure is applied thereon, and then, the pore diameter and the pore volume are measured based on the pressure during application of pressure and the volume of mercury introduced into the pores of the partition wall 12 in the test piece. The measurement is performed, for example, in the range of pressures of 0.5 to 20000 psia. Note that, 0.5 psia corresponds to $0.35\times10^{-3}$ kg/mm$^2$, and 20000 psia corresponds to 14 kg/mm$^2$. The range of the pore diameter corresponding to this pressure range is 0.01 to 420 μm. As the constant when calculating the void diameter based on the pressure, for example, a contact angle of 140° and a surface tension of 480 dyn/cm are used. The average pore diameter of the partition wall 12 is the pore diameter at which the cumulative pore volume reaches 50% (the pore diameter at 50% of the cumulative value of the pore volume) in the pore diameter distribution of the partition wall 12. The porosity of the partition wall 12 can be calculated based on the following equation. In the case where the partition wall material is cordierite, for example, 2.52 can be used as the true specific gravity of cordierite.

Porosity of partition wall 12 (%)=(total pore volume)/((total pore volume)+1/(true specific gravity of partition wall material))×100

The substrate 10 has a length L10, which can be adjusted as appropriate, and is preferably 50 mm or more and 160 mm or less, and more preferably 80 mm or more and 130 mm or less, from the viewpoint of improving the exhaust gas purification performance, improving the PM collecting performance, and easily being mounted on a limited space of a vehicle.

The volume of the substrate 10 can be adjusted as appropriate, and is preferably 0.5 L or more and 2.5 L or less, more preferably 0.5 L or more and 2.0 L or less, and more preferably 0.7 L or more and 1.8 L or less, from the viewpoint of improving the exhaust gas purification performance, improving the PM collecting performance, and easily being mounted on a limited space of a vehicle. The volume of the substrate 10 refers to an apparent volume of the substrate 10. In the case where the substrate 10 is cylindrical and the outer diameter of the substrate 10 is defined as "2r" and the length of the substrate 10 is defined as "L", the volume of the substrate 10 is represented by the equation: volume of substrate 10=$\pi\times r^2\times L$.

«Catalyst Portion»

Hereinafter, the first catalyst portion 20 and the second catalyst portion 30 will be described.

As shown in FIGS. 4 and 6 to 8, the first catalyst portion 20 is formed on the first region S1*a* of the surface on the inflow-side cell 13*a* side of the partition wall 12.

The surface on the inflow-side cell 13*a* side of the partition wall 12 is the outer surface on the inflow-side cell 13*a* side which defines the outer shape of the partition wall 12. As shown in FIGS. 4 to 8, the surface on the inflow-side cell 13*a* side of the partition wall 12 is constituted of the first region S1*a* and the second region S1*b*.

Figure 4:
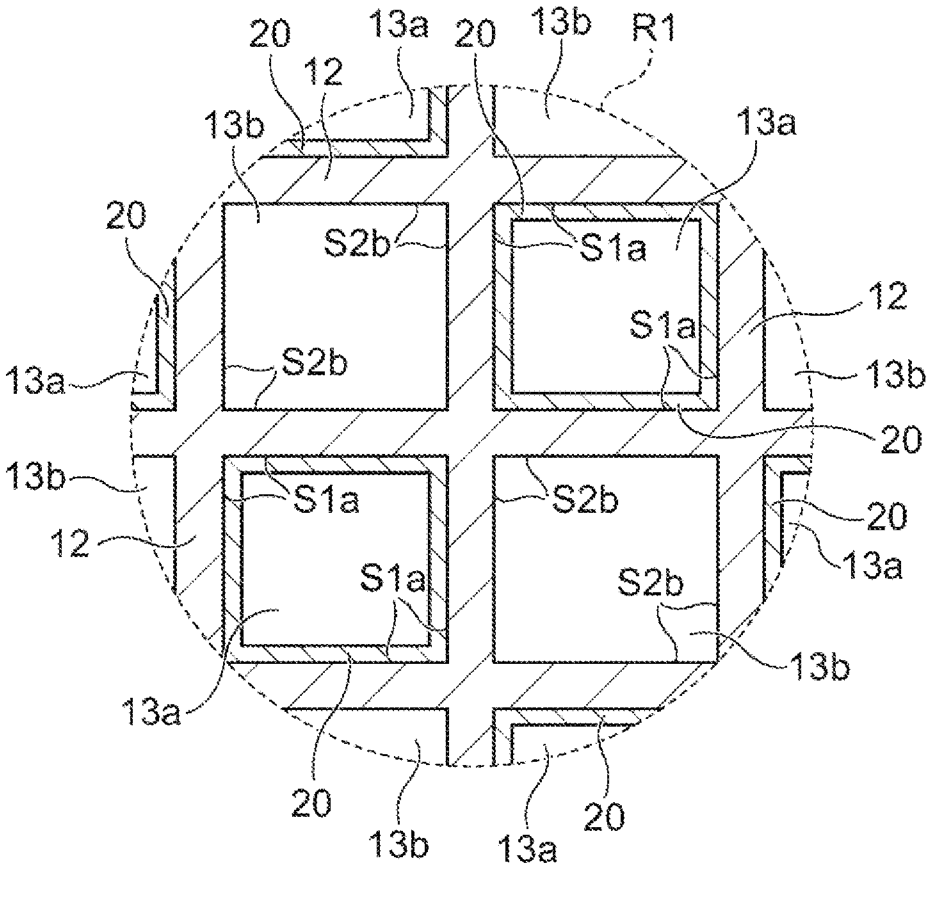
FIG. 4 is an enlarged view of a region denoted by the reference sign R1 in FIG. 2.

The first region S1*a* is a region of the surface on the inflow-side cell 13*a* side of the partition wall 12, wherein the region extends from the end on the exhaust gas inflow side of the partition wall 12 along the exhaust gas flow direction E. In the first region Sla, the region on which the first catalyst portion 20 is formed may be a continuous region or a plurality of discontinuous regions. That is, the first catalyst portion 20 may be constituted of a continuous structure or a plurality of discontinuous structures. For example, the first catalyst portion 20 may be constituted of a plurality of discontinuous structures scattered on the first region S1*a*. The "structure" refers to a material having a certain shape. Examples of the shape of the structure include a layered shape, a spherical shape, a granular shape, a needle-like shape, a scaly (flaky) shape, an indefinite shape, and a shape in which two or more of them are combined. In FIGS. 4 and 6, from the viewpoint of simplifying the drawings, the first catalyst portion 20 is depicted as a layered structure for convenience.

Whether the first catalyst portion 20 is formed on the first region Sla can be confirmed by confirming the existence of an element characteristic of the first catalyst portion 20 (an element that is contained in the first catalyst portion 20, but is not contained in the substrate 10) in the first region S1*a*, using a scanning electron microscope-energy dispersive X-ray spectroscopy (SEM-EDX) or the like.

The second region S1*b* is a region other than the first region Sla, of the surface on the inflow-side cell 13*a* side of the partition wall 12. The first catalyst portion 20 is not formed on the second region S1*b*.

Figure 7A:
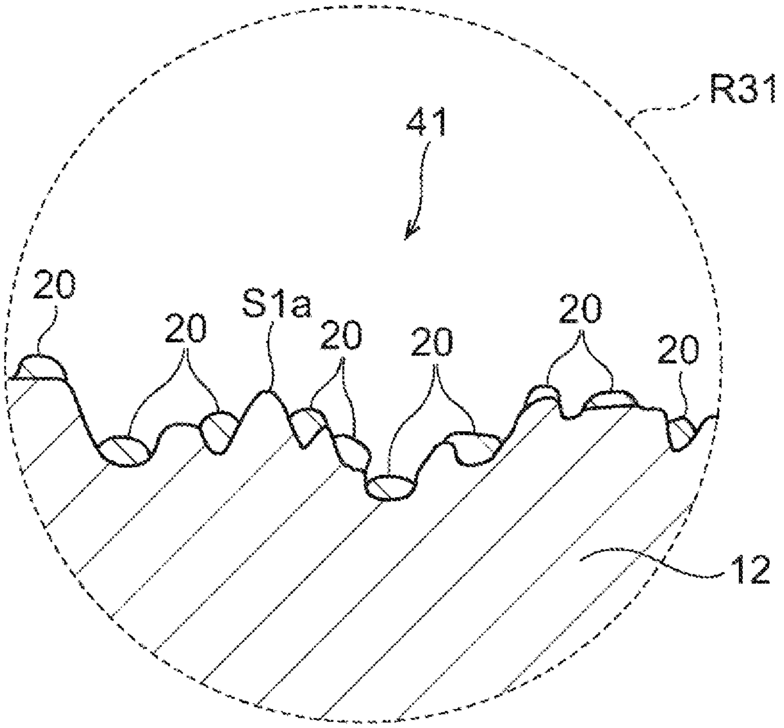
FIG. 7A is an enlarged view of a region denoted by the reference sign R31 in FIG. 6.

As shown in FIG. 7A, the first catalyst portion 20 rises from the first region S1*a* towards the inflow-side cell 13*a* side, and covers part of the first region S1*a*.

The first catalyst portion 20 may have a second portion existing inside the partition wall 12, in addition to a first portion rising from the first region S1*a* towards the inflow-side cell 13*a* side. The partition wall 12 is porous, so that when the first catalyst portion 20 is formed, the second portion may be formed together with the first portion. The first portion and the second portion may be continuously existed.

As shown in FIGS. 5 to 8, the second catalyst portion 30 is formed on the first region S2*a* of the surface on the outflow-side cell 13*b* side of the partition wall 12.

The surface on the outflow-side cell 13*b* side of the partition wall 12 is the outer surface on the outflow-side cell 13*b* side which defines the outer shape of the partition wall 12. As shown in FIGS. 4 to 8, the surface on the outflow-side cell 13*b* side of the partition wall 12 is constituted of the first region S2*a* and the second region S2*b*.

Figure 5:
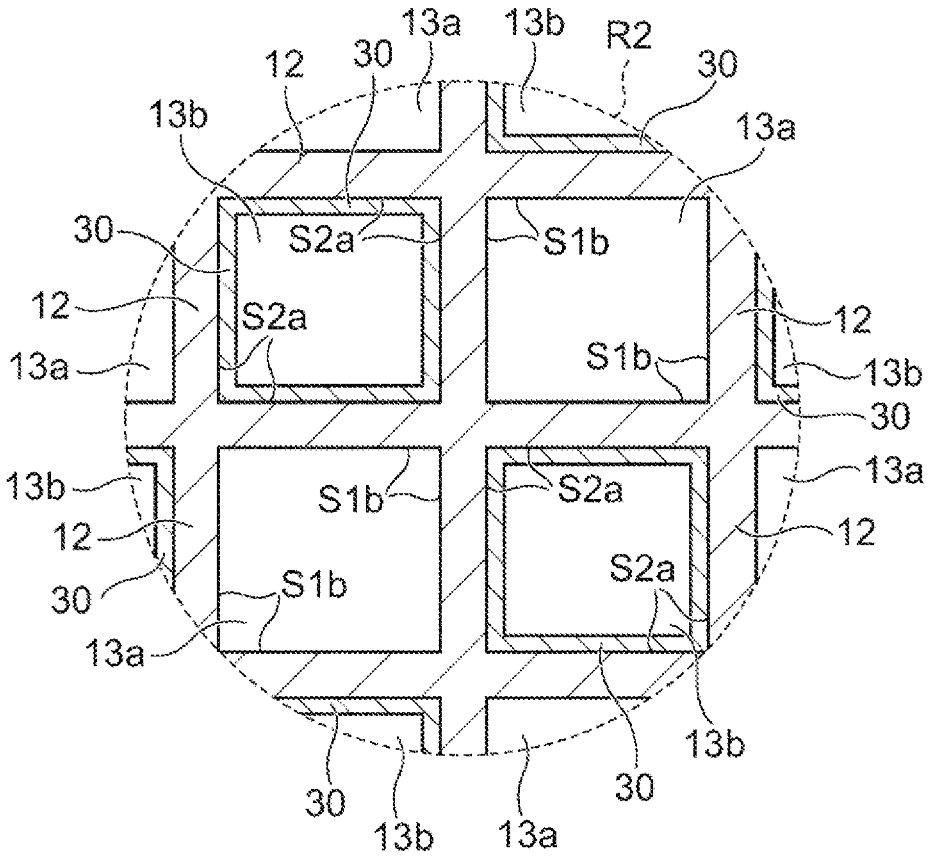
FIG. 5 is an enlarged view of a region denoted by the reference sign R2 in FIG. 3.

The first region S2*a* is a region of the surface on the outflow-side cell 13*b* side of the partition wall 12, wherein the region extends from the end on the exhaust gas outflow side of the partition wall 12 along a direction opposite to the exhaust gas flow direction E. In the first region S2*a*, the region on which the second catalyst portion 30 is formed may be a continuous region or a plurality of discontinuous regions. That is, the second catalyst portion 30 may be constituted of a continuous structure or a plurality of discontinuous structures. For example, the second catalyst portion 30 may be constituted of a plurality of discontinuous structures scattered on the first region S2*a*. The meaning of the structure and examples of the shape of the structure are the same as above. In FIGS. 5 and 6, from the viewpoint of simplifying the drawings, the second catalyst portion 30 is depicted as a layered structure for convenience.

Whether the second catalyst portion 30 is formed on the first region S2*a* can be confirmed by confirming the existence of an element characteristic of the second catalyst portion 30 (an element that is contained in the second catalyst portion 30, but is not contained in the substrate 10) in the first region S2*a*, using a scanning electron microscope-energy dispersive X-ray spectroscopy (SEM-EDX) or the like.

The second region S2*b* is a region other than the first region S2*a*, of the surface on the outflow-side cell 13*b* side of the partition wall 12. The second catalyst portion 30 is not formed on the second region S2*b*.

Figure 7B:
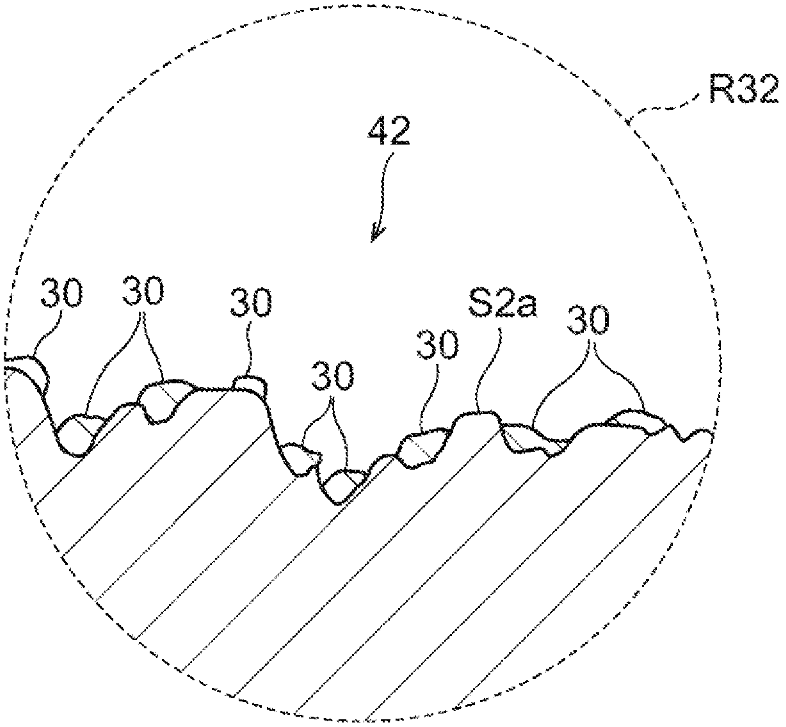
FIG. 7B is an enlarged view of a region denoted by the reference sign R32 in FIG. 6.
Figure 8:
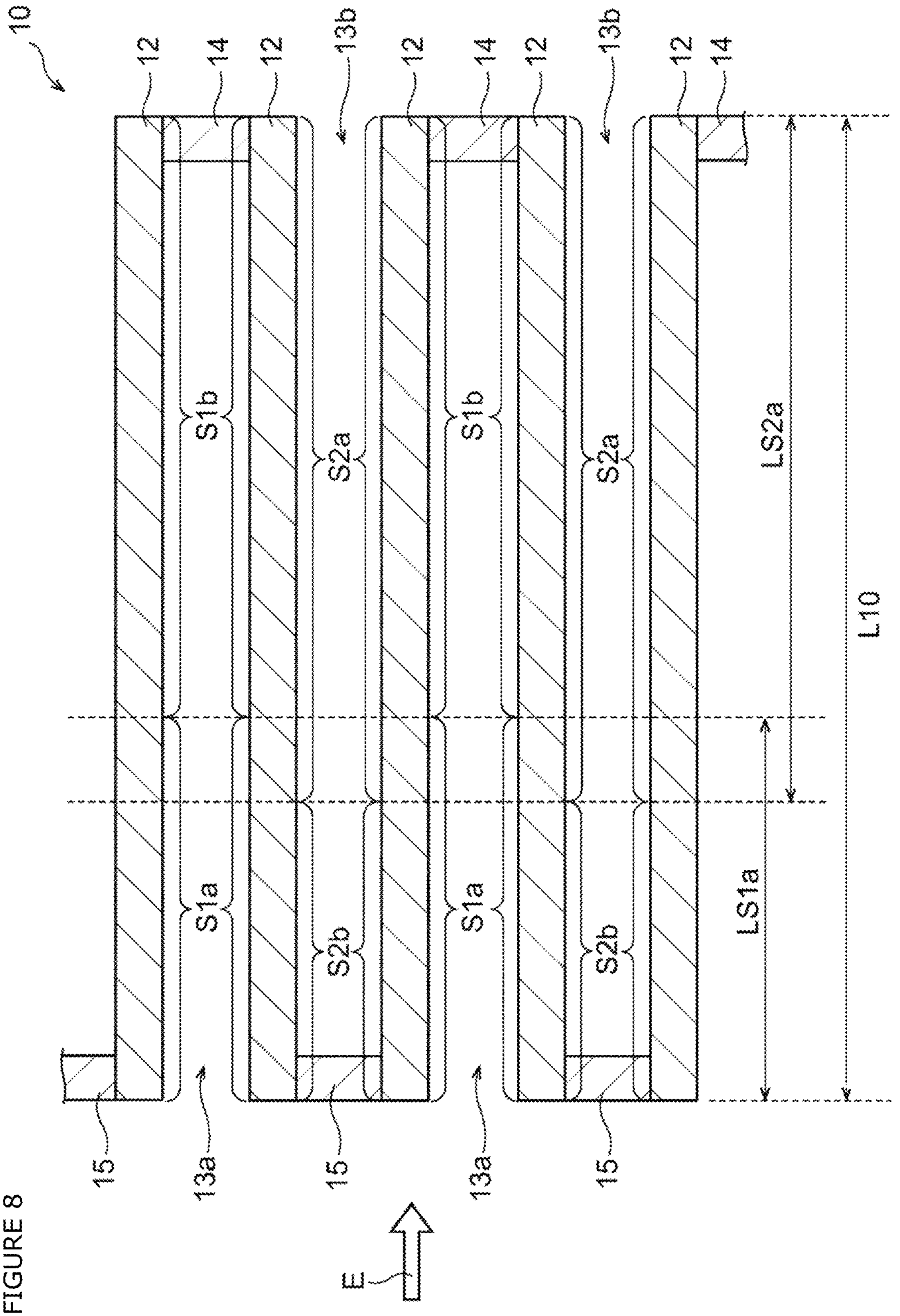
FIG. 8 is a view illustrating a first region and a second region of a surface on an inflow-side cell side of a partition wall as well as a first region and a second region of a surface on an outflow-side cell side of a partition wall (a view in which a first catalyst portion and a second catalyst portion were omitted from FIG. 6).

As shown in FIG. 7B, the second catalyst portion 30 rises from the first region S2*a* towards the outflow-side cell 13*b* side, and covers part of the first region S2*a*.

The second catalyst portion 30 may have a second portion existing inside the partition wall 12, in addition to a first portion rising from the first region S2*a* towards the outflow-side cell 13*b* side. The partition wall 12 is porous, so that when the second catalyst portion 30 is formed, the second portion may be formed together with the first portion. The first portion and the second portion may be continuously existed.

The first region S1*a* has a length LS1*a*, which refers to a distance between the end face on the exhaust gas inflow side of the substrate 10, and a plane that passes through a point positioned closest to the exhaust gas outflow side among all the points on the surface of the first catalyst portions 20 formed on the first region S1*a* and that is perpendicular to the axial direction of the substrate 10. The length LS1*a* of the first region Sla can be adjusted as appropriate. The first region S1*a* may extend from the end on the exhaust gas inflow side of the partition wall 12 to the end on the exhaust gas outflow side of the partition wall 12 along the exhaust gas flow direction E, but preferably extends from the end on the exhaust gas inflow side of the partition wall 12 along the exhaust gas flow direction E so as not to reach the end on the exhaust gas outflow side of the partition wall 12.

The first region S2*a* has a length LS2*a*, which refers to a distance between the end face on the exhaust gas outflow side of the substrate 10, and a plane that passes through a point positioned closest to the exhaust gas inflow side among all the points on the surface of the second catalyst portions 30 formed on the first region S2*a* and that is perpendicular to the axial direction of the substrate 10. The length LS2*a* of the first region S2*a* can be adjusted as appropriate. The first region S2*a* may extend from the end on the exhaust gas outflow side of the partition wall 12 to the end on the exhaust gas inflow side of the partition wall 12 along the direction opposite to the exhaust gas flow direction E, but preferably extends from the end on the exhaust gas outflow side of the partition wall 12 along the direction opposite to the exhaust gas flow direction E so as not to reach the end on the exhaust gas inflow side of the partition wall 12.

From the viewpoint of more effectively achieving the improvement of the exhaust gas purification performance and the improvement of the PM collecting performance, the ratio of the total length of the length LS1*a* of the first region S1*a* and the length LS2*a* of the first region S2*a* to the length L10 of the substrate 10 ((LS1*a*+LS2*a*)/L10) is preferably 0.30 or more and 1.8 or less, more preferably 0.50 or more and 1.5 or less, and still more preferably 1.0 or more and 1.3 or less. The total length of the length LS1*a* of the first region S1*a* and the length LS2*a* of the first region S2*a* refers to the length LS2*a* of the first region S2*a* in the embodiment in which the first catalyst portion 20 is omitted, and refers to the length LS1*a* of the first region S1*a* in the embodiment in which the second catalyst portion 30 is omitted.

From the viewpoint of more effectively achieving the improvement of the exhaust gas purification performance and the improvement of the PM collecting performance, the ratio of the length LS1*a* of the first region S1*a* to the length L10 of the substrate 10 (LS1*a*/L10) is preferably 0.15 or more and 0.90 or less, more preferably 0.20 or more and 0.80 or less, and still more preferably 0.30 or more and 0.80 or less.

From the viewpoint of more effectively achieving the improvement of the exhaust gas purification performance and the improvement of the PM collecting performance, the ratio of the length LS2*a* of the first region S2*a* to the length L10 of the substrate 10 (LS2*a*/L10) is preferably 0.15 or more and 0.90 or less, more preferably 0.20 or more and 0.80 or less, and still more preferably 0.30 or more and 0.80 or less.

One example of the method of measuring the length LS1*a* of the first region S1*a* is as follows:

A sample extending in the axial direction of the substrate 10 and having the same length as the length L10 of the substrate 10 is cut out from the exhaust gas purification catalyst 1. The sample is, for example, in the form of a cylinder having a diameter of 25.4 mm. The value of the diameter of the sample can be changed as necessary. The sample is cut at 5 mm intervals in planes perpendicular to the axial direction of the substrate 10 to obtain cut pieces, which are referred to as the first cut piece, the second cut piece and so on up to the n-th cut piece, sequentially from the side of the end on the exhaust gas inflow side of the sample. The length of each cut piece is 5 mm. The composition of each cut piece is analyzed using an inductively coupled plasma emission spectrophotometer (ICP-OES), an X-ray fluorescence analyzer (XRF), SEM-EDX or the like, and it is confirmed whether or not the cut piece includes part of the first catalyst portion 20, based on the composition of the cut piece.

The compositional analysis is not necessarily performed for a cut piece that apparently includes part of the first catalyst portion 20. For example, it is possible to confirm whether or not each cut piece includes part of the first catalyst portion 20, by observing the cross section thereof using SEM, EPMA or the like. At the time of observing the cross section, element mapping of the cross section may be performed. The element mapping can be performed in the same manner as described above.

After confirming whether or not each cut piece includes part of the first catalyst portion 20, the length LS1*a* of the first region S1*a* included in the sample is calculated based on the following equation:

$$\text{Length } LS1a \text{ of first region } S1a \text{ included in sample} = 5 \text{ mm} \times \text{(number of cut pieces each including part of first catalyst portion 20)}$$

For example, in the case where each of the first cut piece to the k-th cut piece includes part of the first catalyst portion 20, but each of the (k+1)-th to the n-th cut pieces does not include part of the first catalyst portion 20, the length LS1*a* of the first region S1*a* included in the sample is (5×k) mm.

One example of more specifically measuring the length LS1*a* of the first region S1*a* is as follows:

The k-th cut piece (namely, the cut piece closest to the exhaust gas outflow side, among the cut pieces each including part of the first catalyst portion 20) is cut in the axial direction of the substrate 10, and part of the first catalyst portion 20 existing in the resulting cross section is observed using SEM, EPMA or the like, to measure the length of part of the first region S1*a* included in the k-th cut piece. Thereafter, the length LS1*a* of the first region S1*a* included in the sample is calculated based on the following equation:

$$\text{Length } LS1a \text{ of first region } S1a \text{ included in sample} = (5\ \text{mm} \times (k-1)) + (\text{length of part of first region } S1a \text{ included in k-th cut piece})$$

The length LS1*a* of the first region S1*a* included in the sample is calculated for 8 to 16 samples arbitrarily cut out from the exhaust gas purification catalyst 1, and the mean value of the measured lengths is defined as the length LS1*a* of the first region S1*a*.

The above description with respect to the method of measuring the length LS1*a* of the first region S1*a* is also applied to the method of measuring the length LS2*a* of the first region S2*a*. Upon application, "the length LS1*a* of the first region Sla" is replaced with "the length LS2*a* of the first region S2*a*", and "the first catalyst portion 20" is replaced with "the second catalyst portion 30". However, in the method of measuring the length LS2*a* of the first region S2*a*, the sample is cut at 5 mm intervals in planes perpendicular to the axial direction of the substrate 10 to obtain cut pieces, which are referred to as the first cut piece, the second cut piece and so on up to the n-th cut piece, sequentially from the side of the end on the exhaust gas outflow side of the sample.

From the viewpoint of more effectively achieving the improvement of the PM collecting performance and the suppression of the increase in pressure loss, the total mass of the first catalyst portion 20 and the second catalyst portion 30 per unit volume of the substrate 10 (the total mass after drying and firing) is preferably 5 g/L or more and 25 g/L or less, and more preferably 10 g/L or more and 20 g/L or less. The total mass of the first catalyst portion 20 and the second catalyst portion 30 refers to the mass of the second catalyst portion 30 in the embodiment in which the first catalyst portion 20 is omitted, and refers to the mass of the first catalyst portion 20 in the embodiment in which the second catalyst portion 30 is omitted. The total mass of the first catalyst portion 20 and the second catalyst portion 30 per unit volume of the substrate 10 is calculated based on the expression: (total mass of first catalyst portion 20 and second catalyst portion 30)/(volume of substrate 10).

From the viewpoint of more effectively achieving the improvement of the PM collecting performance and the suppression of the increase in pressure loss, the mass of the first catalyst portion 20 per unit volume of the substrate 10 (the mass after drying and firing) is preferably 2 g/L or more and 20 g/L or less, and more preferably and 3 g/L or more and 15 g/L or less. The mass of the first catalyst portion 20 per unit volume of the substrate 10 is calculated based on the expression: (mass of first catalyst portion 20)/(volume of substrate 10).

From the viewpoint of more effectively achieving the improvement of the PM collecting performance and the suppression of the increase in pressure loss, the mass of the second catalyst portion 30 per unit volume of the substrate 10 (the total mass after drying and firing) is preferably 2 g/L or more and 20 g/L or less, and more preferably 3 g/L or more and 15 g/L or less. The mass of the second catalyst portion 30 per unit volume of the substrate 10 is calculated based on the expression: (mass of second catalyst portion 30)/(volume of substrate 10).

As shown in FIG. 7A, part of the first region S1*a* is covered with the first catalyst portion 20, whereas remaining part of the first region S1*a* is exposed without being covered with the first catalyst portion 20, whereby the surface of the first catalyst portion 20 and the remaining part of the first region S1*a* together form a first uneven surface 41. From the viewpoint of simplifying the drawings, FIGS. 4 and 6 are illustrated as if the whole of the first region S1*a* is covered with the first catalyst portion 20 for convenience, but in fact, the part of the first region S1*a* is covered with the first catalyst portion 20, whereas the remaining part of the first region Sla is exposed without being covered with the first catalyst portion 20, as shown in FIG. 7A.

As shown in FIG. 7B, part of the first region S2*a* is covered with the second catalyst portion 30, whereas remaining part of the first region S2*a* is exposed without being covered with the second catalyst portion 30, whereby the surface of the second catalyst portion 30 and the remaining part of the first region S2*a* together form a second uneven surface 42. FIGS. 5 and 6 are illustrated as if the whole of the first region S2*a* is covered with the second catalyst portion 30 for convenience, but in fact, the part of the first region S2*a* is covered with the second catalyst portion 30, whereas the remaining part of the first region S2*a* is exposed without being covered with the second catalyst portion 30, as shown in FIG. 7B.

In the exhaust gas purification catalyst 1, the first catalyst portion 20 satisfies the following expressions (11) and (12):

$$0.20 \le R_{11} \le 0.80 \tag{11}$$

$$0.30 \le R_{12} \le 0.85. \tag{12}$$

This allows the improvement of the PM collecting performance and the suppression of the increase in pressure loss to be achieved.

In the expression (11), $R_{11}$ represents the ratio of the area of the part of the first region S1*a* covered with the first catalyst portion 20 to the area of the first region S1*a*.

In the expression (12), $R_{12}$ represents the ratio of the surface roughness of the first uneven surface 41 to the surface roughness of the first region S1*a*.

The surface roughness of the first region S1*a* refers to the surface roughness of the first region S1*a* before the first catalyst portion 20 is formed.

$R_{11}$ satisfying the expression (11) represents a state in which the pores in the vicinity of the first region S1*a* are moderately embedded with the first catalyst portion 20, and this allows the suppression of the increase in pressure loss to be achieved.

$R_{12}$ satisfying the expression (12) represents a state in which the large pores in the vicinity of the first region S1*a* are moderately embedded with the first catalyst portion 20, and this allows the improvement of the PM collecting performance to be achieved.

The second catalyst portion 30 satisfies the following expressions (21) and (22):

$$0.20 \le R_{21} \le 0.80 \tag{21}$$

$$0.30 \le R_{22} \le 0.85. \tag{22}$$

In the expression (21), $R_{21}$ represents the ratio of the area of the part of the first region S2*a* covered with the second catalyst portion 30 to the area of the first region S2*a*.

In the expression (22), $R_{22}$ represents the ratio of the surface roughness of the second uneven surface 42 to the surface roughness of the first region S2*a*.

The surface roughness of the first region S2*a* refers to the surface roughness of the first region S2*a* before the second catalyst portion 30 is formed.

$R_{21}$ satisfying the expression (21) represents a state in which the pores in the vicinity of the first region S2*a* are moderately embedded with the second catalyst portion 30, and this allows the suppression of the increase in pressure loss to be achieved.

$R_{22}$ satisfying the expression (22) represents a state in which the large pores in the vicinity of the first region S2*a* are moderately embedded with the second catalyst portion 30, and this allows the improvement of the PM collecting performance to be achieved.

From the viewpoint of more effectively achieving the suppression of the increase in pressure loss, $R_{11}$ is preferably 0.20 or more and 0.80 or less, more preferably 0.20 or more and 0.70 or less, and still more preferably 0.25 or more and 0.65 or less.

From the viewpoint of more effectively achieving the improvement of the PM collecting performance, $R_{12}$ is preferably 0.30 or more and 0.85 or less, more preferably 0.40 or more and 0.80 or less, and still more preferably 0.50 or more and 0.80 or less.

From the viewpoint of more effectively achieving the suppression of the increase in pressure loss, $R_{21}$ is preferably 0.20 or more and 0.80 or less, more preferably 0.20 or more and 0.70 or less, and still more preferably 0.25 or more and 0.65 or less.

From the viewpoint of more effectively achieving the improvement of the PM collecting performance, $R_{22}$ is preferably 0.30 or more and 0.85 or less, more preferably 0.40 or more and 0.80 or less, and still more preferably 0.50 or more and 0.80 or less.

From the viewpoint of more effectively achieving the improvement of the PM collecting performance and the suppression of the increase in pressure loss, the first catalyst portion 20 preferably satisfies the following expression (13):

$$0.060 \leq R_{13} \leq 0.55. \quad (13)$$

In the expression (13), $R_{13}$ represents a value obtained by multiplying $R_{11}$ by $R_{12}$. $R_{11}$ and $R_{12}$ have the same meanings as above.

From the viewpoint of more effectively achieving the improvement of the PM collecting performance and the suppression of the increase in pressure loss, $R_{13}$ is preferably 0.10 or more and 0.55 or less, more preferably 0.10 or more and 0.50 or less, and still more preferably 0.10 or more and 0.45 or less, and still more preferably 0.10 or more and 0.43 or less.

From the viewpoint of more effectively achieving the improvement of the PM collecting performance and the suppression of the increase in pressure loss, the second catalyst portion 30 preferably satisfies the following expression (23):

$$0.060 \leq R_{23} \leq 0.55. \quad (23)$$

In the expression (23), $R_{23}$ represents a value obtained by multiplying $R_{21}$ by $R_{22}$. $R_{21}$ and $R_{22}$ have the same meanings as above.

From the viewpoint of more effectively achieving the improvement of the PM collecting performance and the suppression of the increase in pressure loss, $R_{23}$ is preferably 0.10 or more and 0.55 or less, more preferably 0.10 or more and 0.50 or less, still more preferably 0.10 or more and 0.45 or less, and still more preferably 0.10 or more and 0.43 or less.

<Method of calculating $R_{11}$>

The method of calculating $R_{11}$ is as follows.

Figure 9:
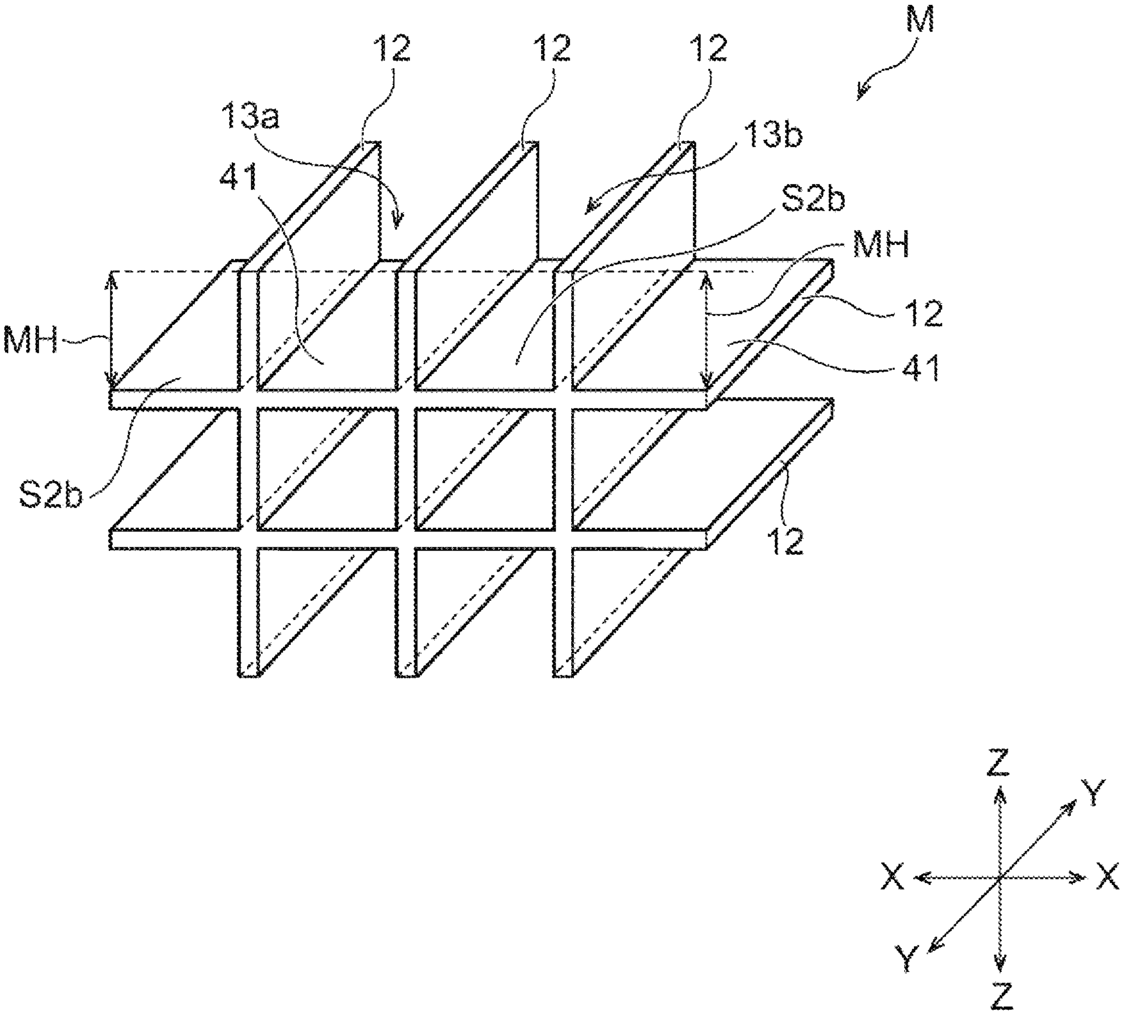
FIG. 9 is a perspective view of a cut piece used for calculation of $R_{11}$ or $R_{12}$.
Figure 10:
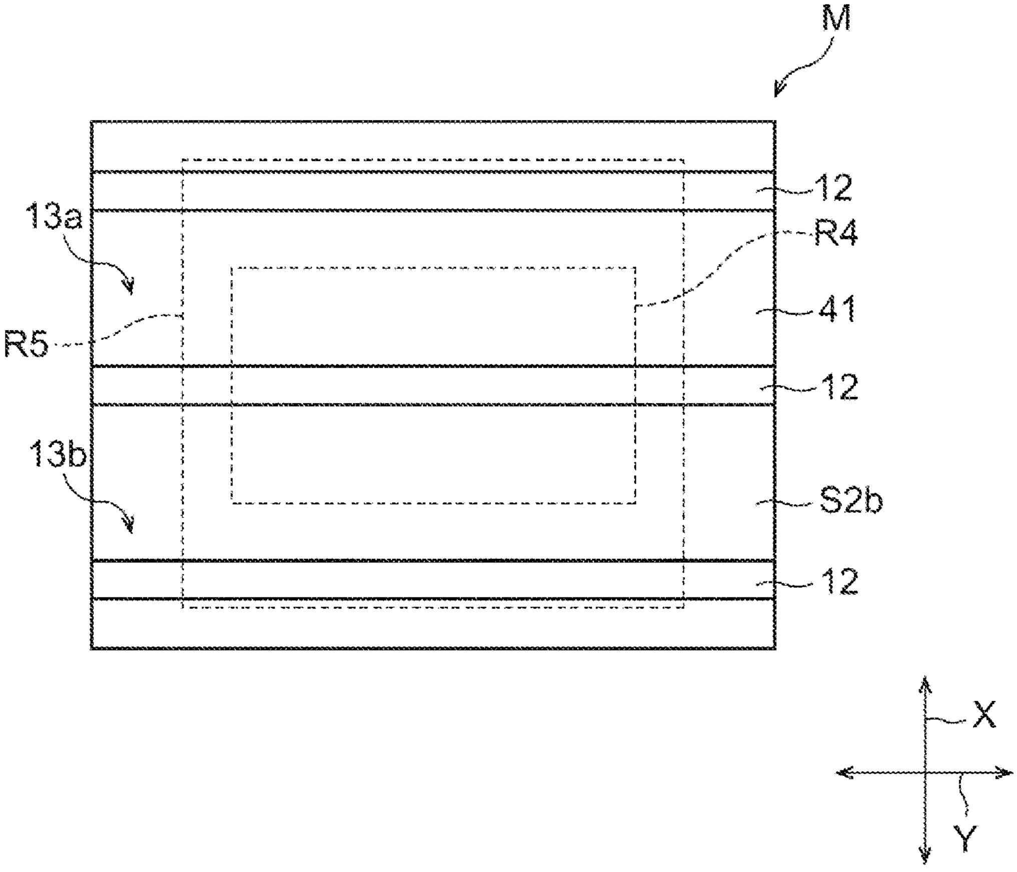
FIG. 10 is a plan view of the cut piece shown in FIG. 9 (a plan view in which the cut piece shown in FIG. 9 is viewed from the Z direction).

The exhaust gas purification catalyst 1 is cut in planes parallel to the axial direction of substrate 10 and in planes perpendicular to the axial direction of the substrate 10, and a portion represented by the reference sign M in FIG. 6 is cut out from the exhaust gas purification catalyst 1, thereby preparing a cut piece M shown in FIGS. 9 and 10. The cut piece M includes the first uneven surface 41, but does not include the second uneven surface 42. The length of the first uneven surface 41 included in the cut piece M is equal to the length of the cut piece M. The cut piece M can be obtained from the vicinity of the end on the exhaust gas inflow side of the exhaust gas purification catalyst 1. For example, the cut piece M having a length of 10 mm and including the first uneven surface 41, but not including the second uneven surface 42 can be obtained by cutting in planes perpendicular to the axial direction of the substrate 10 at two places 5 mm and 15 mm apart from the end on the exhaust gas inflow side of the substrate 10 to the exhaust gas flow direction E. The size of the cut piece M can be changed as appropriate, as necessary.

As shown in FIGS. 9 and 10, the first uneven surface 41 is exposed, and the second region S2*b* (this region is not covered with the second catalyst portion 30) is also exposed, in the cut piece M.

Figure 11:
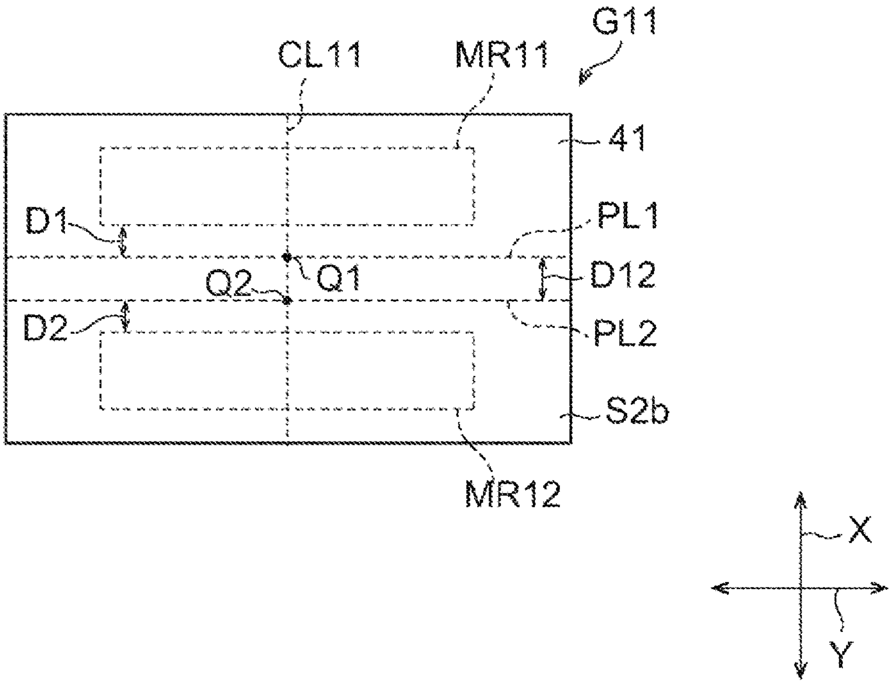
FIG. 11 is a schematic view of an SEM image used for calculation of $R_{11}$.

A region denoted by the reference sign R4 in FIG. 10 is observed in the Z axial direction (the direction perpendicular to the plane of paper of FIG. 10) with a scanning electron microscope (SEM), and an SEM image G11 shown in FIG. 11 is taken. At this time, the SEM image G11 is taken such that a length direction Y of the cut piece M corresponds to the horizontal direction of the SEM image G11, as shown in FIG. 11.

The SEM image G11 includes the first uneven surface 41, the second region S2*b* (this region is not covered with the second catalyst portion 30), and the partition wall 12 positioned therebetween (see FIG. 10).

The thickness of the partition wall 12 included in the SEM image G11 is calculated. Specifically, as shown in FIG. 11, intersection points Q1 and Q2 between a center line CL11 perpendicular to the horizontal direction of the SEM image G11 and outlines of the partition wall 12 are specified, and a distance D12 between the intersection point Q1 and the intersection point Q2 is defined as the thickness of the partition wall 12.

As shown in FIG. 11, a line PL1 parallel to the horizontal direction of the SEM image G11 is drawn from the intersection point Q1, and a line PL2 parallel to the horizontal direction of the SEM image G11 is drawn from the intersection point Q2.

As shown in FIG. 11, a rectangular measurement region MR11 is set at a position separated from the line PL1 at a distance D1 in the first uneven surface 41, and a rectangular measurement region MR12 is set at a position separated from the line PL2 at a distance D2 in the second region S2*b* (this region is not covered with the second catalyst portion 30). The distances D1 and D2 are 0.5 times the thickness of the partition wall 12 (distance D12). The dimension of the measurement regions MR11 and MR12 in the vertical direction (X axial direction in FIG. 11) is 1.5 times the thickness of the partition wall 12 (distance D12), and the dimension of the measurement regions MR11 and MR12 in the horizontal direction (Y axial direction in FIG. 11) is 5 times the thickness of the partition wall 12 (distance D12).

A Si mapping image of the SEM image G11 is obtained. A mapping object element may be an element other than silicon (Si), as long as it is an element characteristic of the substrate 10 (an element contained in the substrate 10, but not contained in the first catalyst portion 20 or the second catalyst portion 30).

In the Si mapping image, the regions other than the measurement regions MR11 and MR12 are masked, and then, the measurement regions MR11 and MR12 are binarized. Binarization conditions are as follows.

$$\text{Threshold} = ((\text{average luminance value of background}) + (\text{average luminance value of object portion}))/2$$

The number of dots of the binarized measurement regions MR11 and MR12 are measured, and $R_{11}$ is calculated based on the following equation.

$$R_{11} = 1 - ((\text{number of dots in binarized measurement region } MR11)/(\text{number of dots in binarized measurement region } MR12))$$

In the calculation of $R_{11}$, the number of dots in the binarized measurement region MR11 is considered as the area of part of the first region S1*a* which is not covered with the first catalyst portion 20, and the number of dots in the binarized measurement region MR12 is considered as the area of the first region S1*a*.

$R_{11}$ is calculated for each of three cut pieces M, and the average value thereof is defined as $R_{11}$ of the exhaust gas purification catalyst 1.

The measurement equipment and measurement conditions used in the calculation of $R_{11}$ are as follows.

Apparatus name: desktop scanning electron microscope
Model: JCM-7000
Manufacturer: JEOL Ltd.
Detector mode: EX-54700U1L21
Accelerating voltage: 5 kV
Magnification: arbitrary
Measurement element: Si (K-line)
Mapping pixel number: 512×384
Process time: T1
Number of sweeps: 20
Dwell time: 0.02 ms
Filter: Average (3×3)

<Method of Calculating $R_{12}$>

The method of calculating $R_{12}$ is as follows.

The cut piece M shown in FIGS. 9 and 10 is prepared in the same manner as above.

As shown in FIGS. 9 and 10, the first uneven surface 41 is exposed, and the second region S2*b* (this region is not covered with the second catalyst portion 30) is also exposed, in the cut piece M. A height MH of the partition wall 12 positioned between these exposed surfaces is adjusted to 500 μm or more.

Figure 12:
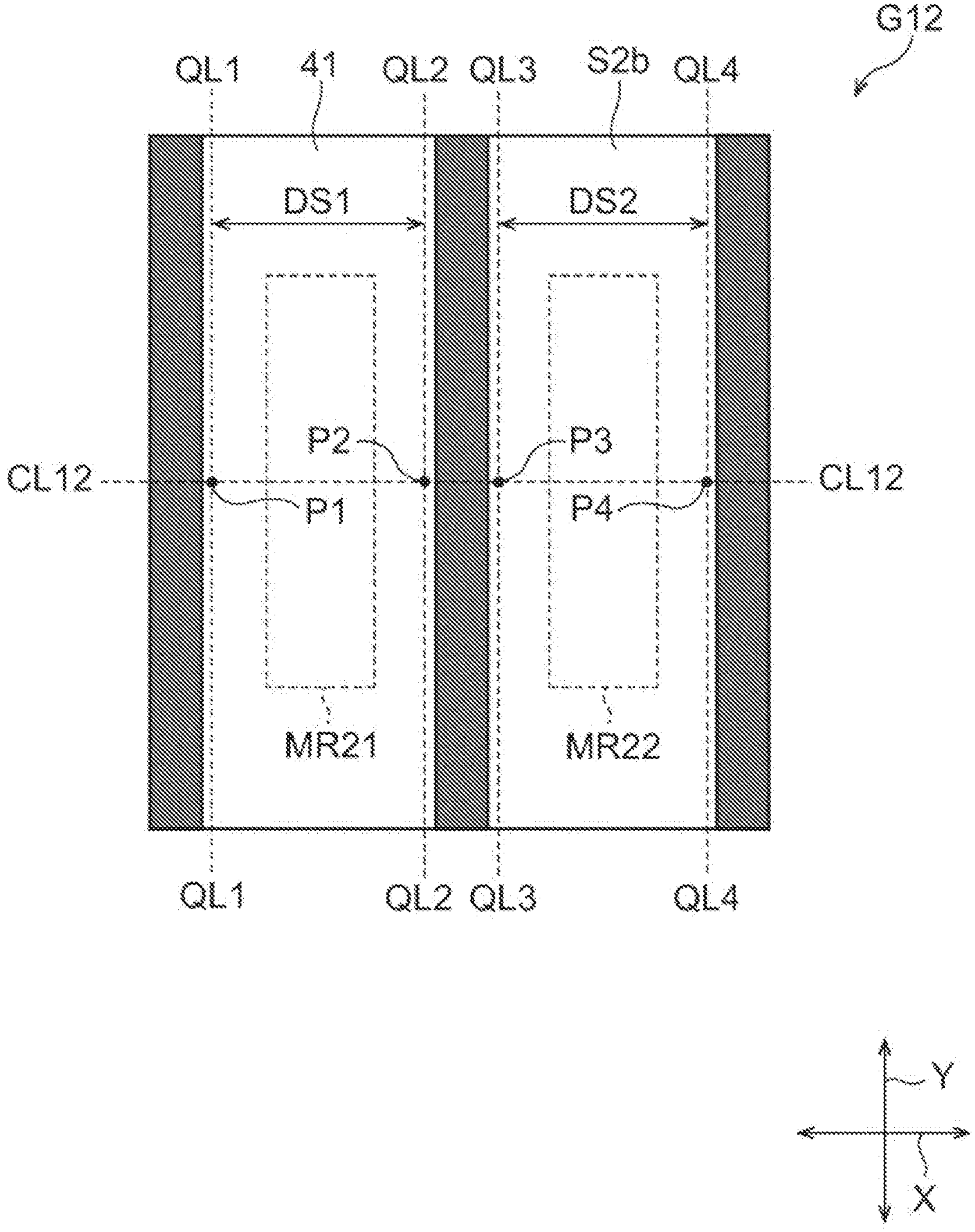
FIG. 12 is a schematic view of a scanned image with a surface roughness meter used for calculation of $R_{12}$.

A region denoted by the reference sign R5 in FIG. 10 is scanned in the Z axial direction (the direction perpendicular to the plane of paper of FIG. 10) with a surface roughness meter, a scanned image G12 shown in FIG. 12 is taken, and then, the surface roughness is measured. At this time, the scanned image G12 is taken such that the length direction Y of the cut piece M corresponds to the Y axial direction (vertical direction in FIG. 12) of the scanned image G12, as shown in FIG. 12. In addition, the scan magnification is adjusted such that the entire region denoted by the reference sign R5 in FIG. 10 is included in the scan range. Upon scanning, focusing is performed on the second region S2*b*, and the scan range in the Z axial direction (the direction perpendicular to the plane of paper of FIG. 10) is set to ±400 μm based on the second region S2*b* on which focusing has been performed. Since the height MH of the partition wall 12 is adjusted to 500 μm or more, the partition wall 12 is out of the scan range. As shown in FIG. 12, the partition wall 12 is displayed black as null in the scanned image G12.

As shown in FIG. 12, line analysis of a center line CL12 perpendicular to the Y axial direction (vertical direction in FIG. 12) of the scanned image G12 is carried out. By considering portions out of the scan range continuously existing over 10 μm or more as the partition wall 12, x coordinates of a left end point P1 and a right end point P2 of the first uneven surface 41 as well as x coordinates of a left end point P3 and a right end point P4 of the second region S2*b* are determined.

As shown in FIG. 12, a line QL1 passing through the left end point P1 and parallel to the Y axial direction of the scanned image G12, and a line QL2 passing through the right end point P2 and parallel to the Y axial direction of the scanned image G12 are drawn. These lines are defined as boundaries between the first uneven surface 41 and the partition wall 12. A distance DS1 between the line QL1 and the line QL2 is defined as the width (dimension in the X axial direction) of the first uneven surface 41.

As shown in FIG. 12, a line QL3 passing through the left end point P3 and parallel to the Y axial direction of the scanned image G12, and a line QL4 passing through the right end point P4 and parallel to the Y axial direction of the scanned image G12 are drawn. These lines are defined as boundaries between the second region S2*b* and the partition wall 12. A distance DS2 between the line QL3 and the line QL4 is defined as the width (dimension in the X axial direction) of the second region S2*b*.

As shown in FIG. 12, a rectangular measurement region MR21 is set at a position separated from the lines QL1 and QL2 at a predetermined distance (0.25 times the width of the first uneven surface 41 (distance DS1)) in the first uneven surface 41, and a rectangular measurement region MR22 is set at a position separated from the lines QL3 and QL4 at a predetermined distance (0.25 times the width of the second region S2*b* (distance DS2)) in the second region S2*b*. The dimension of the measurement region MR21 in the X axial direction (horizontal direction in FIG. 12) is 0.5 times the width of the first uneven surface 41 (distance DS1), and the dimension of the measurement region MR21 in the Y axial direction (vertical direction in FIG. 12) is 2 times the width of the first uneven surface 41 (distance DS1). The dimension of the measurement region MR22 in the X axial direction (horizontal direction in FIG. 12) is 0.5 times the width of the second region S2*b* (distance DS2), and the dimension of the measurement region MR22 in the Y axial direction (vertical direction in FIG. 12) is 2 times the width of the second region S2*b* (distance DS2).

The maximum surface roughness and the minimum surface roughness in the area ratio range of 1% to 99% are determined based on the frequency distribution of the surface roughness in the measurement region MR21, and a difference V1 between the maximum surface roughness and the minimum surface roughness is calculated. Similarly, the maximum surface roughness and the minimum surface roughness in the area ratio range of 1% to 99% are determined based on the frequency distribution of the surface roughness in the measurement region MR22, and a difference V2 between the maximum surface roughness and the minimum surface roughness is calculated. The area ratio refers to the cumulative area ratio from the smallest surface roughness (the same applies hereafter). Based on the following equation, the ratio $R_{12}$ of the surface roughness of the first uneven surface 41 to the surface roughness of the first region S1*a* (the first region S1*a* before the first catalyst portion 20 is formed) is calculated.

$$R_{12} = V1/V2$$

In the calculation of $R_{12}$, the difference V1 is considered as the surface roughness of the first uneven surface 41, and the difference V2 is considered as the surface roughness of the first region S1*a* (the first region S1*a* before the first catalyst portion 20 is formed).

$R_{12}$ is calculated for each of three cut pieces M, and the average value thereof is defined as $R_{12}$ of the exhaust gas purification catalyst 1.

The measurement equipment and measurement conditions used in the calculation of $R_{12}$ are as follows.

Apparatus name: non-contact surface shape measuring apparatus

Model: Nexview

Manufacturer: Zygo Corporation

Measurement mode: CSI (coherence scanning interferometry)

Measurement lens: ×2.75

Measurement range: 3.01 mm×3.01 mm (XY range)

Scan Length: 800 μm (Z range)

The difference V2 is usually 20 μm or more and 120 μm or less, preferably 40 μm or more and 100 μm or less, and more preferably 50 μm or more and 80 μm or less.

<Method of Calculating $R_{21}$>

The method of calculating $R_{21}$ is as follows.

Figure 13:
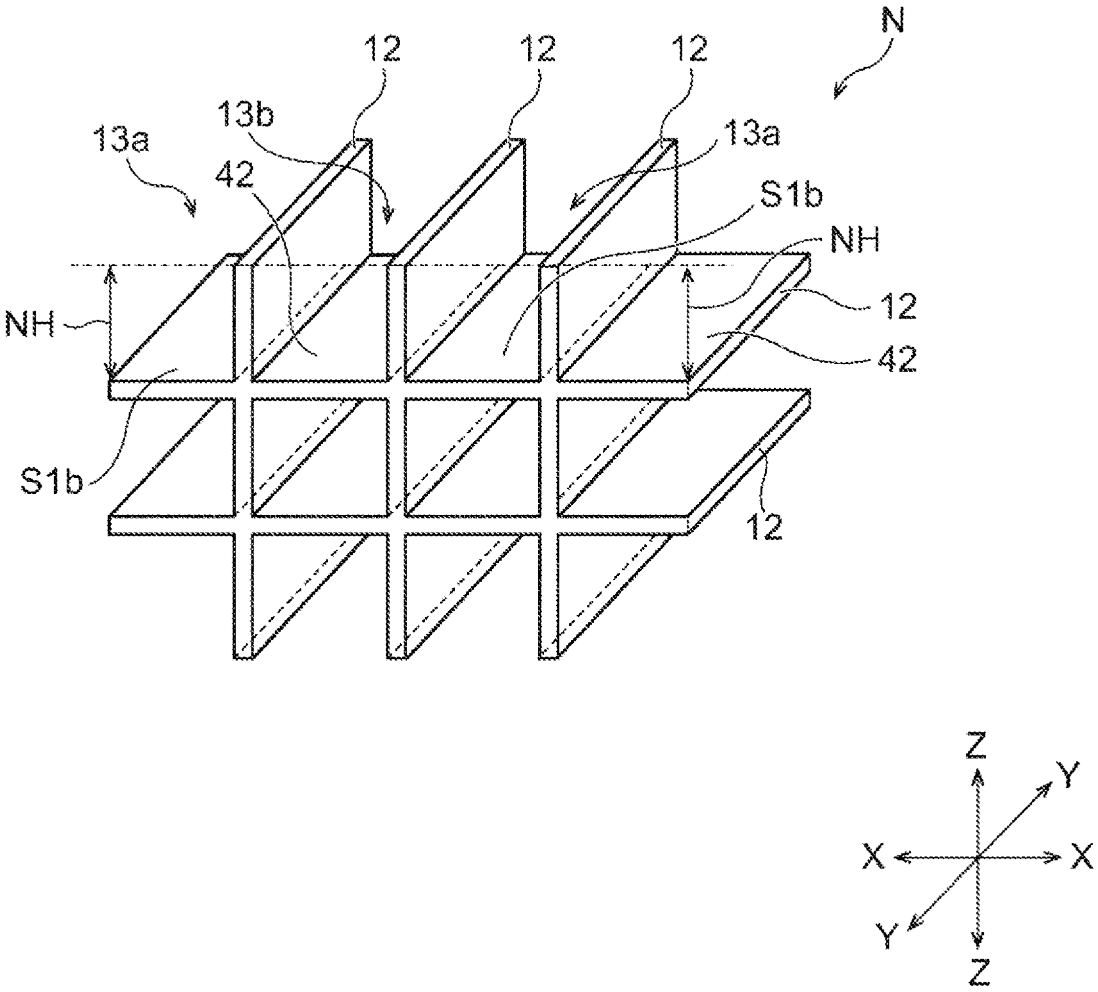
FIG. 13 is a perspective view of a cut piece used for calculation of $R_{21}$ or $R_{22}$.
Figure 14:
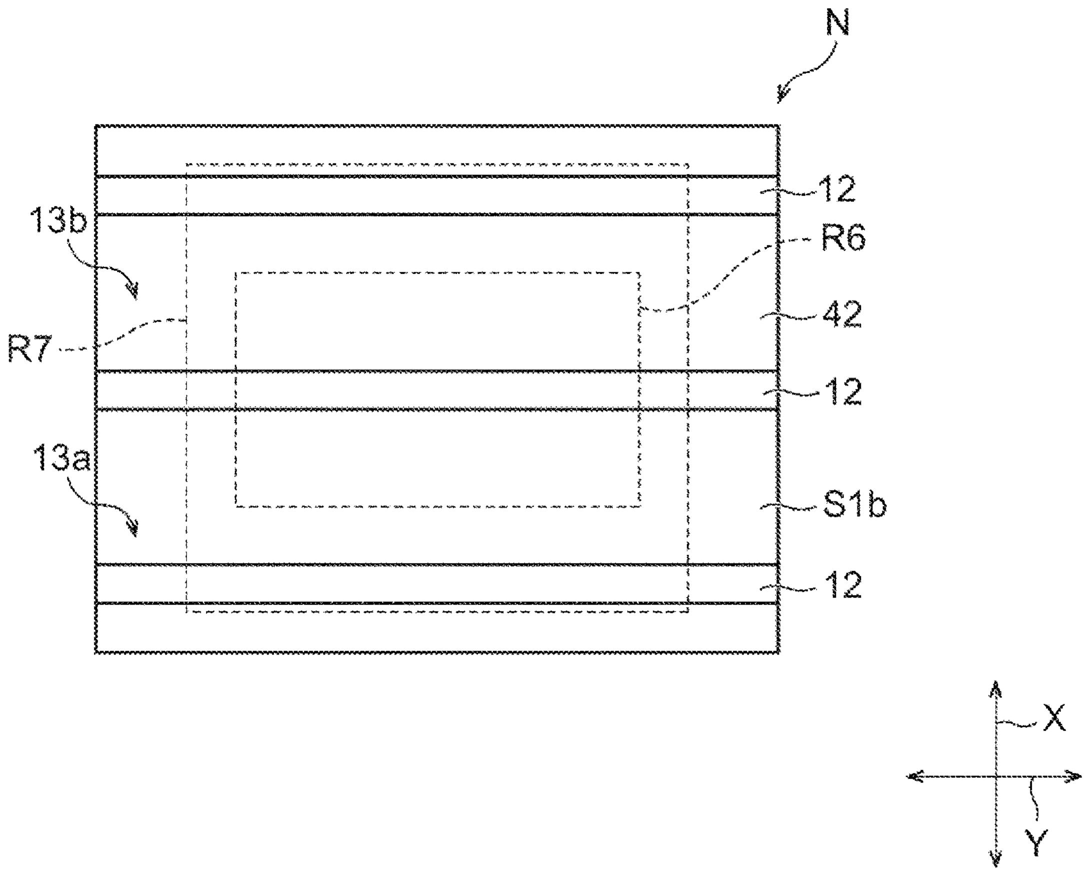
FIG. 14 is a plan view of the cut piece shown in FIG. 13 (a plan view in which the cut piece shown in FIG. 13 is viewed from the Z direction).

The exhaust gas purification catalyst 1 is cut in planes parallel to the axial direction of substrate 10 and in planes perpendicular to the axial direction of the substrate 10, and a portion represented by the reference sign N in FIG. 6 is cut out from the exhaust gas purification catalyst 1, thereby preparing a cut piece N shown in FIGS. 13 and 14. The cut piece N includes the second uneven surface 42, but does not include the first uneven surface 41. The length of the second uneven surface 42 included in the cut piece N is equal to the length of the cut piece N. The cut piece N can be obtained from the vicinity of the end on the exhaust gas outflow side of the exhaust gas purification catalyst 1. For example, the cut piece N having a length of 10 mm and including the second uneven surface 42, but not including the first uneven surface 41 can be obtained by cutting in planes perpendicular to the axial direction of the substrate 10 at two places 5 mm and 15 mm apart from the end on the exhaust gas outflow side of the substrate 10 to the direction opposite to the exhaust gas flow direction E. The size of the cut piece N can be changed as appropriate, as necessary.

As shown in FIGS. 13 and 14, the second uneven surface 42 is exposed, and the second region S1*b* (this region is not covered with the first catalyst portion 20) is also exposed, in the cut piece N.

Figure 15:
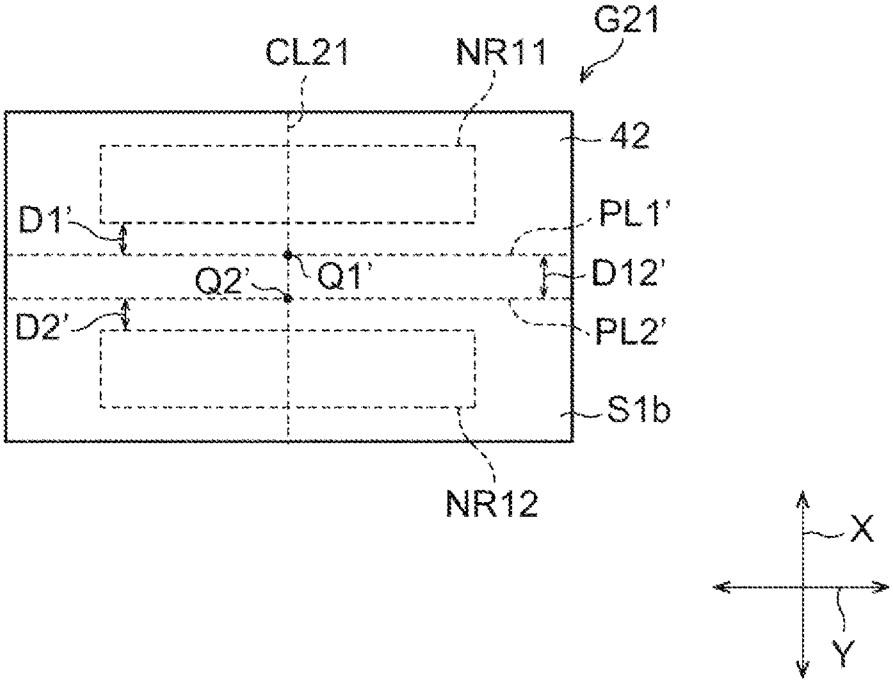
FIG. 15 is a schematic view of an SEM image used for calculation of $R_{21}$.

A region denoted by the reference sign R6 in FIG. 14 is observed in the Z axial direction (the direction perpendicular to the plane of paper of FIG. 14) with a scanning electron microscope (SEM), and an SEM image G21 shown in FIG. 15 is taken. At this time, the SEM image G21 is taken such that a length direction Y of the cut piece N corresponds to the horizontal direction of the SEM image G21, as shown in FIG. 15.

The SEM image G21 includes the second uneven surface 42, the second region S1*b* (this region is not covered with the first catalyst portion 20), and the partition wall 12 positioned therebetween (see FIG. 14).

The thickness of the partition wall 12 included in the SEM image G21 is calculated. Specifically, as shown in FIG. 15, intersection points Q1' and Q2' between a center line CL21 perpendicular to the horizontal direction of the SEM image G21 and outlines of the partition wall 12 are specified, and a distance D12' between the intersection point Q1' and the intersection point Q2' is defined as the thickness of the partition wall 12.

As shown in FIG. 15, a line PL1' parallel to the horizontal direction of the SEM image G21 is drawn from the intersection point Q1', and a line PL2' parallel to the horizontal direction of the SEM image G21 is drawn from the intersection point Q2'.

As shown in FIG. 15, a rectangular measurement region NR11 is set at a position separated from the line PL1' at a distance D1' in the second uneven surface 42, and a rectangular measurement region NR12 is set at a position separated from the line PL2' at a distance D2' in the second region S1*b* (this region is not covered with the first catalyst portion 20). The distances D1' and D2' are 0.5 times the thickness of the partition wall 12 (distance D12'). The dimension of the measurement regions NR11 and NR12 in the vertical direction (X axial direction in FIG. 15) is 1.5 times the thickness of the partition wall 12 (distance D12'), and the dimension of the measurement regions NR11 and NR12 in the horizontal direction (Y axial direction in FIG. 15) is 5 times the thickness of the partition wall 12 (distance D12').

A Si mapping image of the SEM image G21 is obtained. A mapping object element may be an element other than silicon (Si), as long as it is an element characteristic of the substrate 10 (an element contained in the substrate 10, but not contained in the first catalyst portion 20 or the second catalyst portion 30).

In the Si mapping image, the regions other than the measurement regions NR11 and NR12 are masked, and then, the measurement regions NR11 and NR12 are binarized. Binarization conditions are as follows.

$$\text{Threshold} = ((\text{average luminance value of background}) + (\text{average luminance value of object portion}))/2$$

The number of dots of the binarized measurement regions NR11 and NR12 are measured, and $R_{21}$ is calculated based on the following equation.

$$R_{21} = 1 - ((\text{number of dots in binarized measurement region } NR11)/(\text{number of dots in binarized measurement region } NR12))$$

In the calculation of $R_{21}$, the number of dots in the binarized measurement region NR11 is considered as the area of part of the first region S2*a* which is not covered with the second catalyst portion 30, and the number of dots in the binarized measurement region NR12 is considered as the area of the first region S2*a*.

$R_{21}$ is calculated for each of three cut pieces M, and the average value thereof is defined as $R_{21}$ of the exhaust gas purification catalyst 1.

The measurement equipment and measurement conditions used in the calculation of $R_{21}$ are the same as those of $R_{11}$.

<Method of Calculating $R_{22}$>

The method of calculating $R_{22}$ is as follows.

The cut piece N shown in FIGS. 13 and 14 is prepared in the same manner as above.

As shown in FIGS. 13 and 14, the second uneven surface 42 is exposed, and the second region S1*b* (this region is not covered with the first catalyst portion 20) is also exposed, in the cut piece N. A height NH of the partition wall 12 positioned between these exposed surfaces is adjusted to 500 μm or more.

Figure 16:
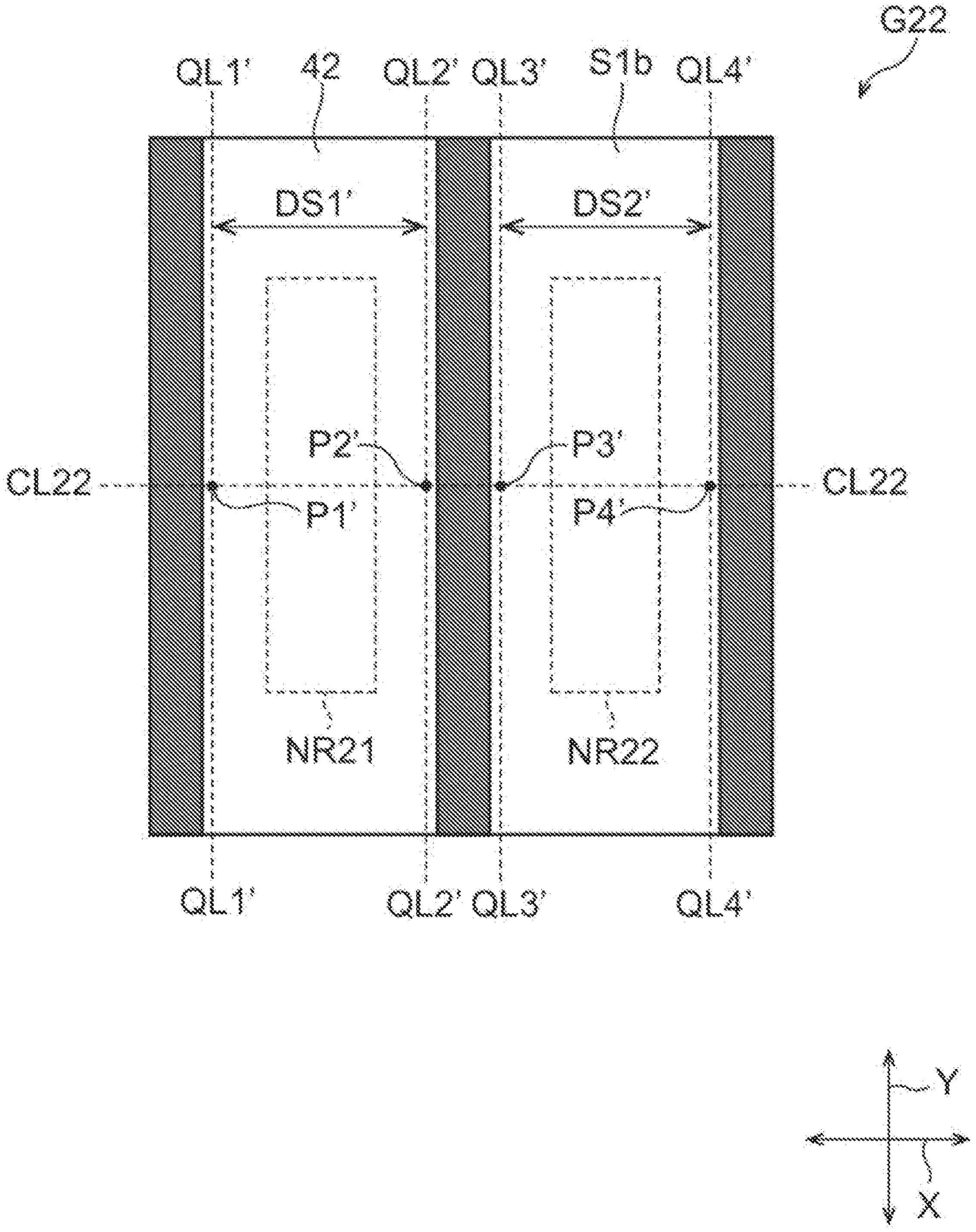
FIG. 16 is a schematic view of a scanned image with a surface roughness meter used for calculation of $R_{22}$.

A region denoted by the reference sign R7 in FIG. 14 is scanned in the Z axial direction (the direction perpendicular to the plane of paper of FIG. 14) with a surface roughness meter, a scanned image G22 shown in FIG. 16 is taken, and then, the surface roughness is measured. At this time, the scanned image G22 is taken such that the length direction Y of the cut piece N corresponds to the Y axial direction (vertical direction in FIG. 16) of the scanned image G22. In addition, the scan magnification is adjusted such that the entire region denoted by the reference sign R7 in FIG. 14 is included in the scan range. Upon scanning, focusing is performed on the second region S1*b*, and the scan range in the Z axial direction (the direction perpendicular to the plane of paper of FIG. 14) is set to ±400 μm based on the second region S1*b* on which focusing has been performed. Since the height NH of the partition wall 12 is adjusted to 500 μm or more, the partition wall 12 is out of the scan range. As shown in FIG. 16, the partition wall 12 is displayed black as null in the scanned image G22.

As shown in FIG. 16, line analysis of a center line CL22 perpendicular to the Y axial direction (vertical direction in FIG. 16) of the scanned image G22 is carried out. By considering portions out of the scan range continuously existing over 10 μm or more as the partition wall 12, x coordinates of a left end point P1' and a right end point P2' of the second uneven surface 42 as well as x coordinates of a left end point P3' and a right end point P4' of the second region S1*b* are determined.

As shown in FIG. 16, a line QL1' passing through the left end point P1' and parallel to the Y axial direction of the scanned image G22, and a line QL2' passing through the right end point P2' and parallel to the Y axial direction of the scanned image G22 are drawn. These lines are defined as boundaries between the second uneven surface 42 and the partition wall 12. A distance DS1' between the line QL1' and the line QL2' is defined as the width (dimension in the X axial direction) of the second uneven surface 42.

As shown in FIG. 16, a line QL3' passing through the left end point P3' and parallel to the Y axial direction of the scanned image G22, and a line QL4' passing through the right end point P4' and parallel to the Y axial direction of the scanned image G22 are drawn. These lines are defined as boundaries between the second region S1*b* and the partition wall 12. A distance DS2' between the line QL3' and the line QL4' is defined as the width (dimension in the X axial direction) of the second region S1*b*.

As shown in FIG. 16, a rectangular measurement region NR21 is set at a position separated from the lines QL1' and QL2' at a predetermined distance (0.25 times the width of the second uneven surface 42 (distance DS1')) in the second uneven surface 42, and a rectangular measurement region NR22 is set at a position separated from the lines QL3' and QL4' at a predetermined distance (0.25 times the width of the second region S1*b* (distance DS2')) in the second region S1*b*. The dimension of the measurement region NR21 in the X axial direction (horizontal direction in FIG. 16) is 0.5 times the width of the second uneven surface 42 (distance DS1'), and the dimension of the measurement region NR21 in the Y axial direction (vertical direction in FIG. 16) is 2 times the width of the second uneven surface 42 (distance DS1'). The dimension of the measurement region NR22 in the X axial direction (horizontal direction in FIG. 16) is 0.5 times the width of the second region S1*b* (distance DS2'), and the dimension of the measurement region NR22 in the Y axial direction (vertical direction in FIG. 16) is 2 times the width of the second region S1*b* (distance DS2').

The maximum surface roughness and the minimum surface roughness in the area ratio range of 1% to 99% are determined based on the frequency distribution of the surface roughness in the measurement region NR21, and a difference V1' between the maximum surface roughness and the minimum surface roughness is calculated. Similarly, the maximum surface roughness and the minimum surface roughness in the area ratio range of 1% to 99% are determined based on the frequency distribution of the surface roughness in the measurement region NR22, and a difference V2' between the maximum surface roughness and the minimum surface roughness is calculated. Based on the following equation, the ratio $R_{22}$ of the surface roughness of the second uneven surface 42 to the surface roughness of the first region S2*a* (the first region S2*a* before the second catalyst portion 30 is formed) is calculated.

$$R_{22} = V1'/V2'$$

In the calculation of $R_{22}$, the difference V1' is considered as the surface roughness of the second uneven surface 42, and the difference V2' is considered as the surface roughness of the first region S2*a* (the first region S2*a* before the second catalyst portion 30 is formed).

$R_{22}$ is calculated for each of three cut pieces N, and the average value thereof is defined as $R_{22}$ of the exhaust gas purification catalyst 1.

The measurement equipment and measurement conditions used in the calculation of $R_{22}$ are the same as those of $R_{12}$.

The difference V2' is usually 20 μm or more and 120 μm or less, preferably 40 μm or more and 100 μm or less, and more preferably 50 μm or more and 80 μm or less.

<Components of Catalyst Portion>

The first catalyst portion 20 and the second catalyst portion 30 each contain at least one noble metal element. The noble metal element can be selected, for example, from platinum element (Pt), palladium element (Pd), rhodium element (Rh), ruthenium element (Ru), iridium element (Ir), osmium element (Os) and the like, and is preferably selected from Pt, Pd and Rh elements from the viewpoint of enhancing the exhaust gas purification performance.

The noble metal element is contained in each of the first catalyst portion 20 and the second catalyst portion 30 in a form capable of functioning as a catalytically-active component, for example, in a form of a noble metal, an alloy containing a noble metal element, a compound containing a noble metal element (e.g., an oxide of a noble metal element) or the like. The catalytically-active component is preferably in a form of particles from the viewpoint of enhancing the exhaust gas purification performance.

From the viewpoint of balancing the exhaust gas purification performance and the cost, the amount of the noble metal element (when the catalyst portion contains two or more noble metal elements, the total amount of the two or more noble metal elements) per unit volume of the substrate 10 is preferably 0.5 g/L or more and 1.5 g/L or less in terms of noble metal.

It is preferable that the first catalyst portion 30 and the second catalyst portion 30 each contain a carrier, and that the catalytically-active component is supported on the carrier.

The expression that "a catalytically-active component is supported on a carrier" refers to a state in which the catalytically-active component is physically or chemically adsorbed or retained on the outer surface, or the inner surface of the pores, of the carrier. For example, when a carrier and a catalytically-active component are present in the same region in the element mapping obtained by analyzing a cross section of a catalyst portion by an EDS (energy dispersive spectrometer), it can be determined that the catalytically-active component is supported on the carrier.

Examples of the carrier include inorganic oxide particles. The inorganic oxide constituting the inorganic oxide particles may be an inorganic oxide having an oxygen storage capacity (OSC) (also referred to as an "oxygen storage component"), or may be an inorganic oxide other than the oxygen storage component.

Examples of the oxygen storage component include cerium oxide, a composite oxide containing cerium element and zirconium element ($CeO_2$—$ZrO_2$-based composite oxide) and the like.

In the $CeO_2$—$ZrO_2$-based complex oxide, cerium oxide and zirconium oxide preferably form a solid solution phase. In the $CeO_2$—$ZrO_2$-based complex oxide, cerium oxide and zirconium oxide may each form a single phase (a cerium oxide phase or a zirconium oxide phase) in addition to the solid solution phase.

The $CeO_2$—$ZrO_2$-based complex oxide may contain one or more metal elements other than cerium element and zirconium element. The metal element other than cerium element and zirconium element may form a solid solution phase with cerium oxide and/or zirconium oxide, or may form a single phase. Examples of the metal element other than cerium element and zirconium element include a rare earth element other than cerium element, an alkaline earth metal, a transition metal and the like.

Examples of the inorganic oxide other than the oxygen storage component include alumina, silica, silica-alumina, alumina-silicate, alumina-zirconia, alumina-chromia, alumina-ceria, alumina-lanthana, titania and the like.

«Production Method of Exhaust Gas Purification Catalyst»

A production method of the exhaust gas purification catalyst 1 will now be described.

The substrate 10, a slurry for forming the first catalyst portion 20 and a slurry for forming the second catalyst portion 30 are prepared.

The compositions of the slurries for forming the first catalyst portion 20 and the second catalyst portion 30 are adjusted depending on the compositions of the first catalyst portion 20 and the second catalyst portion 30, respectively. Each slurry contains, for example, a supply source of a noble metal element, inorganic oxide particles, a binder, a pore forming agent, a solvent and the like. Examples of the supply source of the noble metal element include a salt of the noble metal element, and examples of the salt of the noble metal element include nitrates, ammine complex salts, acetates, chlorides and the like. Examples of the inorganic oxide constituting the inorganic oxide particles include an oxygen storage component and an inorganic oxide other than the oxygen storage component. Details regarding the oxygen storage component and the inorganic oxide other than the oxygen storage component are the same as described above. Examples of the binder include alumina sol, zirconia sol, titania sol, silica sol, ceria sol and the like. Examples of the pore forming agent include cross-linked polymethyl (meth)acrylate particles, cross-linked polybutyl (meth)acrylate particles, cross-linked polystyrene particles, cross-linked polyacrylate particles, melamine-based resins and the like. Examples of the solvent include water, organic solvents and the like. Examples of the organic solvent include alcohol, acetone, dimethyl sulfoxide, dimethylformamide and the like. One solvent may be used, or two or more solvents may be used as a mixture. The mixture of two or more solvents may be, for example, a mixture of water and one or more organic solvents, a mixture of two or more organic solvents or the like.

The end on the exhaust gas inflow side of the substrate 10 is dipped in the slurry for forming the first catalyst portion 20, and the slurry is suctioned from the opposite side, followed by drying. In this manner, a precursor of the first catalyst portion 20 is formed. By adjusting the solid concentration, viscosity and the like of the slurry, it is possible to adjust the length LS1*a* of the first region S1*a* where the precursor of the first catalyst portion 20 is formed. Further, by adjusting the coating amount of the slurry, the types of materials for forming the slurry, the particle size of the pore forming agent contained in the slurry and the like, it is possible to adjust the thickness of the precursor of the first catalyst portion 20 (eventually, $R_{11}$ and $R_{12}$), and the mass of the precursor of the first catalyst portion 20 per unit volume of the substrate 10 (eventually, the mass of the first catalyst portion 20 per unit volume of the substrate 10). The drying temperature is usually 40° C. or higher and 120° C. or lower.

The end on the exhaust gas outflow side of the substrate 10 is dipped in the slurry for forming the second catalyst portion 30, and the slurry is suctioned from the opposite side, followed by drying. In this manner, a precursor of the second catalyst portion 30 is formed. By adjusting the solid concentration, viscosity and the like of the slurry, it is possible to adjust the length LS2*a* of the first region S2*a* where the precursor of the second catalyst portion 30 is formed. Further, by adjusting the coating amount of the slurry, the types of materials for forming the slurry, the particle size of the pore forming agent contained in the slurry and the like, it is possible to adjust the thickness of the precursor of the second catalyst portion 30 (eventually, $R_{21}$ and $R_{22}$), and the mass of the precursor of the second catalyst portion 30 per unit volume of the substrate 10 (eventually, the mass of the second catalyst portion 30 per unit volume of the substrate 10). The drying temperature is usually 40° C. or higher and 120° C. or lower.

The particle size of the inorganic oxide particles in the slurry can be adjusted as appropriate. From the viewpoints of easily adjusting $R_{11}$, $R_{12}$, $R_{21}$ and $R_{22}$ to desired ranges, the $D_{90}$ of the inorganic oxide particles in the slurry is preferably 10 μm or more and 30 μm or less, more preferably 15 μm or more and 25 μm or less. The $D_{90}$ is the particle size at which the cumulative volume reaches 90%, in a particle size distribution based on volume as measured by the laser diffraction scattering particle size distribution measurement method.

The particle size of the pore forming agent can be adjusted as appropriate. From the viewpoints of easily adjusting $R_{11}$, $R_{12}$, $R_{21}$ and $R_{22}$ to desired ranges, the median $D_{50}$ of the pore forming agent is preferably 1 μm or more and 30 μm or less, more preferably 3 μm or more and 25 μm or less, and still more preferably 5 μm or more and 20 μm or less. The $D_{50}$ is the particle size at which the cumulative volume reaches 50%, in a particle size distribution based on volume as measured by the laser diffraction scattering particle size distribution measurement method.

The $D_{50}$ or $D_{90}$ is measured by: introducing a sample to be measured into an aqueous dispersion medium, using an automatic sample feeder ("Microtorac SDC" manufactured by MicrotracBEL Corporation) for a laser diffraction scattering particle size distribution analyzer, irradiating a 40-W ultrasonic wave for 360 seconds in a flow velocity of 26 mL/sec, followed by carrying out measurement using a laser diffraction scattering particle size distribution analyzer (manufactured by MicrotracBEL Corporation "Microtrac MT3300EXII"). The measurement is carried out twice, under the conditions of particle refractive index: 1.5, particle shape: true sphere, solvent refractive index: 1.3, set-zero: 30 seconds, and measurement time: 30 seconds, and the mean value of the measured values is defined as $D_{50}$ or $D_{90}$. Pure water is used as the aqueous dispersion medium.

After the formation of the precursors of the first catalyst portion 20 and the second catalyst portion 30, the resulting substrate is calcined. In this manner, the first catalyst portion 20 and the second catalyst portion 30 are formed. From the viewpoints of preventing a decrease in the catalyst activity and successfully calcining the pore forming agent, the calcination temperature is preferably 350° C. or higher and 550° C. or lower. The calcination is carried out, for example, in an air atmosphere.

EXAMPLES

The present invention will now be specifically described with reference to Examples. However, the present invention is in no way limited to the Examples.

Example 1

(1) Preparation of Slurry

An aqueous rhodium nitrate solution and a diamminedinitritoplatinum aqueous nitric acid solution were mixed, and a Ce—Zr-based composite oxide powder and an alumina powder were added to the mixed solution. Then, a pore forming agent (cross-linked polymethyl (meth)acrylate particles having a median $D_{50}$ of 20 μm), alumina sol, and water as a solvent were added to the mixed solution, thereby preparing a slurry.

The amount of each component in the slurry was adjusted such that the amount of rhodium was 1% by mass in terms of metal, the amount of the Ce—Zr-based composite oxide powder was 75% by mass, the amount of the alumina powder was 7% by mass, the amount of platinum was 9% by mass in terms of metal, and the amount of the alumina sol was 8% by mass in terms of a solid content, based on the mass of the catalyst portion formed by drying and firing of the slurry. In addition, the amount of the pore forming agent in the slurry was adjusted such that the amount of the pore forming agent was 30.0% by mass of the mass of the catalyst portion formed by drying and firing of the slurry. The mass of the catalyst portion formed by drying and firing of the slurry can be determined by subtracting the mass of components that disappear by drying and firing of the slurry (e.g., the solvent and the pore forming agent) from the mass of the slurry. $D_{90}$ of the metal oxide powder (the Ce—Zr-based composite oxide powder and the alumina powder) in the slurry was 20 μm.

(2) Production of Exhaust Gas Purification Catalyst

A substrate having the structure shown in FIG. 2 to FIG. 8, that is, a substrate including an inflow-side cell extending in the axial direction of the substrate, an outflow-side cell extending in the axial direction of the substrate, and a porous partition wall separating the inflow-side cell and the outflow-side cell from each other was prepared. The thickness of the partition wall was 200 to 250 μm, the total number of the inflow-side cells and the outflow-side cells in the cross section perpendicular to the axial direction of the substrate was 300 cells per square inch, the volume of the substrate was 1.0 L, and the length of the substrate was 91 mm. The average pore diameter of the partition wall was 15 μm, and porosity (void content) of the partition wall was 63%.

The end on the exhaust gas inflow side of the substrate was immersed in the slurry, and the slurry was drawn by suction from the opposite side, and then dried at 90° C. for 10 minutes. Thus, a first precursor composed of the solid content of the slurry (a first catalyst portion before firing) was formed on the inflow-side cell side of the partition wall of the substrate.

After drying, the end on the exhaust gas outflow side of the substrate was immersed in the slurry, and the slurry was drawn by suction from the opposite side, and then dried at 90° C. for 10 minutes. Thus, a second precursor composed of the solid content of the slurry (a second catalyst portion before firing) was formed on the outflow-side cell side of the partition wall of the substrate.

Thereafter, the substrate was fired at 450° C. for 1 hour to form the first catalyst portion and the second catalyst portion on the substrate. Thus, an exhaust gas purification catalyst of Example 1 was obtained.

When the end on the exhaust gas inflow side and the end on the exhaust gas outflow side of the substrate were immersed in the slurry, immersion conditions were adjusted such that the ratio of the length of the first region on which the first catalyst portion was formed, of the surface on the inflow-side cell side of the partition wall to the length of the substrate was 0.45, the ratio of the length of the first region on which the second catalyst portion was formed, of the surface on the outflow-side cell side of the partition wall to the length of the substrate was 0.70, and the total mass (WC amount) of the first catalyst portion and the second catalyst portion of the substrate per unit volume was 11 g/L.

$R_{11}$, $R_{12}$, $R_{21}$, and $R_{22}$ were calculated for the exhaust gas purification catalyst of Example 1 according to the above method.

(3) Evaluation of Pressure Loss

The lateral face of the exhaust gas purification catalyst of Example 1 was supported and fixed so that the end face on the exhaust gas inflow side faced upward. Air was drawn by suction at a rate of 50 L/sec from the lower side of the fixed exhaust gas purification catalyst (the end face on the exhaust gas outflow side). The difference between the air pressure at the end face on the exhaust gas inflow side and the air pressure at the end face on the exhaust gas outflow side 10 seconds after the start of suction was determined, and this was defined as the pressure loss of the exhaust gas purification catalyst of Example 1.

Using a substrate (on which neither first catalyst portion nor second catalyst portion was formed) instead of the exhaust gas purification catalyst of Example 1, the difference between the air pressure at the end surface on the exhaust gas inflow side and the air pressure at the end surface on the exhaust gas outflow side 10 seconds after the start of suction was determined in the same manner as above, and this was defined as the pressure loss of the substrate.

A pressure loss ratio (%) was determined based on the following equation.

$$\text{Pressure loss ratio} = \left((\text{pressure loss of exhaust gas purification catalyst of Example 1})/(\text{pressure loss of substrate})\right)\times 100$$

A pressure loss ratio of less than 105% was evaluated as "S", a pressure loss ratio of 105% or more and less than 125% was evaluated as "A", and a pressure loss ratio of 125% or more was evaluated as "B".

(4) Evaluation of PM Collecting Performance

A gasoline engine vehicle using the exhaust gas purification catalyst of Example 1 was driven according to the driving conditions of Worldwide Harmonized Light Vehicles Test Cycle (WLTC). The number of PM particles ($PN_{cat}$) in the exhaust gas passed through the exhaust gas purification catalyst was measured for each of the following periods: a low speed driving period from the start of driving to 589 seconds after the start of driving, a medium speed driving period from 589 seconds to 1022 seconds after the start of driving, a high speed driving period from 1022 seconds to 1477 seconds after the start of driving, and an ultra-high speed driving period from 1477 seconds to 1800 seconds after the start of driving. Further, the number of PM particles ($PN_{all}$) directly discharged from the engine was measured, and the PM collecting performance of the exhaust gas purification catalyst of Example 1 was determined by the following equation.

$$PM\ \text{collecting performance} = 1 - (PN_{cat}/PN_{all})$$

The measurement conditions of the PM collecting performance were as follows.

Evaluated vehicle: 1.5 L direct injection turbo engine

Gasoline used: fuel for verification test

PM measuring apparatus: manufactured by HORIBA, Ltd.

Using a gasoline engine vehicle using a substrate (on which neither first catalyst portion nor second catalyst portion was formed) instead of the exhaust gas purification catalyst of Example 1, the PM collecting performance of the substrate was determined in the same manner as above.

A PM collecting performance ratio (%) was determined based on the following equation.

$$PM\ \text{collecting performance ratio} = \left((PM\ \text{collecting performance of exhaust gas purification catalyst of Example 1})/(PM\ \text{collecting performance of substrate})\right)\times 100$$

A PM collecting performance ratio of more than 110% was evaluated as "S", a PM collecting performance ratio of more than 100% and 110% or less was evaluated as "A", and a PM collecting performance ratio of 100% or less was evaluated as "B".

Example 2

The same operations as Example 1 were performed except that, when the end on the exhaust gas inflow side and the end on the exhaust gas outflow side of the substrate were immersed in the slurry, the immersion conditions were adjusted such that the total mass (WC amount) of the first catalyst portion and the second catalyst portion of the substrate per unit volume was 16 g/L.

Example 3

The same operations as Example 1 were performed except that, when the end on the exhaust gas inflow side and the end on the exhaust gas outflow side of the substrate were immersed in the slurry, the immersion conditions were adjusted such that the total mass (WC amount) of the first catalyst portion and the second catalyst portion of the substrate per unit volume was 20 g/L.

Example 4

The same operations as Example 1 were performed except that cross-linked polymethyl (meth)acrylate particles having a median $D_{50}$ of 5 μm was used as the pore forming agent.

Comparative Example 1

The same operations as Example 1 were performed except that $D_{90}$ of the metal oxide powder (the Ce—Zr-based composite oxide powder and the alumina powder) in the slurry was adjusted to 0.5 μm.

Comparative Example 2

The same operations as Example 1 were performed except that, when the end on the exhaust gas inflow side and the end on the exhaust gas outflow side of the substrate were immersed in the slurry, the immersion conditions were adjusted such that the total mass (WC amount) of the first catalyst portion and the second catalyst portion of the substrate per unit volume was 30 g/L.

Comparative Example 3

The same operations as Example 1 were performed except that, when the end on the exhaust gas inflow side and the end on the exhaust gas outflow side of the substrate were immersed in the slurry, the immersion conditions were adjusted such that the total mass (WC amount) of the first catalyst portion and the second catalyst portion of the substrate per unit volume was 45 g/L.

The results of Examples 1 to 4 and Comparative Examples 1 to 3 are shown in Table 1 and Table 2.

TABLE 1

| | $R_{11}$ | $R_{12}$ | $R_{13}$ | $R_{21}$ | $R_{22}$ | $R_{23}$ |
|---|---|---|---|---|---|---|
| Example 1 | 0.44 | 0.71 | 0.31 | 0.41 | 0.65 | 0.27 |
| Example 2 | 0.64 | 0.63 | 0.41 | 0.59 | 0.62 | 0.37 |

TABLE 1-continued

| | $R_{11}$ | $R_{12}$ | $R_{13}$ | $R_{21}$ | $R_{22}$ | $R_{23}$ |
|---|---|---|---|---|---|---|
| Example 3 | 0.42 | 0.62 | 0.26 | 0.48 | 0.67 | 0.32 |
| Example 4 | 0.26 | 0.78 | 0.20 | 0.30 | 0.76 | 0.23 |
| Comparative Example 1 | 0.63 | 0.90 | 0.57 | 0.68 | 0.91 | 0.62 |
| Comparative Example 2 | 0.97 | 0.63 | 0.61 | 0.98 | 0.64 | 0.62 |
| Comparative Example 3 | 0.99 | 0.47 | 0.47 | 0.99 | 0.46 | 0.45 |

TABLE 2

| | Evaluation of pressure loss | | Evaluation of PM collecting performance | |
|---|---|---|---|---|
| | Pressure loss ratio (%) | Evaluation | PM collecting performance ratio (%) | Evaluation |
| Example 1 | 108 | A | 103 | A |
| Example 2 | 116 | A | 101 | A |
| Example 3 | 118 | A | 106 | A |
| Example 4 | 111 | A | 103 | A |
| Comparative Example 1 | 104 | S | 92 | B |
| Comparative Example 2 | 128 | B | 103 | A |
| Comparative Example 3 | 147 | B | 112 | S |

From the above results, it was confirmed that the exhaust gas purification catalyst satisfying the above expressions (11) and (12) or the above (21) and (22) can achieve the improvement of the PM collecting performance and the suppression of the increase in pressure loss.

The values calculated for determining $R_{11}$, $R_{12}$, $R_{21}$, and $R_{22}$ in Examples 1 to 4 and Comparative Examples 1 to 3 are as shown in Table 3 below.

TABLE 3

| | Difference V1 | Difference V2 | Difference V1' | Difference V2' |
|---|---|---|---|---|
| Example 1 | 45.3 | 63.9 | 43.7 | 67.0 |
| Example 2 | 40.4 | 64.0 | 39.6 | 63.7 |
| Example 3 | 41.5 | 66.6 | 43.8 | 65.8 |
| Example 4 | 50.7 | 65.2 | 51.1 | 67.1 |
| Comparative Example 1 | 59.4 | 65.8 | 59.8 | 65.7 |
| Comparative Example 2 | 40.8 | 64.8 | 42.7 | 67.2 |
| Comparative Example 3 | 30.5 | 64.4 | 29.4 | 64.5 |

DESCRIPTION OF REFERENCE SIGNS

1 . . . exhaust gas purification catalyst
10 . . . substrate
20 . . . first catalyst portion
30 . . . second catalyst portion
11 . . . tubular member of substrate
12 . . . partition wall of substrate
13 . . . cell in substrate
13*a* . . . inflow-side cell
13*b* . . . outflow-side cell
S1*a* . . . first region of surface on inflow-side cell side of partition wall
S1*b* . . . second region of surface on inflow-side cell side of partition wall
S2*a* . . . first region of surface on outflow-side cell side of partition wall
S2*b* . . . second region of surface on outflow-side cell side of partition wall
41 . . . first uneven surface
42 . . . second uneven surface

The invention claimed is:

1. An exhaust gas purification catalyst comprising:

a substrate extending in an exhaust gas flow direction; and at least one of a first catalyst portion and a second catalyst portion each provided on the substrate, wherein the substrate comprises:

an inflow-side cell extending in the exhaust gas flow direction and having an open end on an exhaust gas inflow side thereof and a closed end on an exhaust gas outflow side thereof;

an outflow-side cell extending in the exhaust gas flow direction and having a closed end on an exhaust gas inflow side thereof and an open end on an exhaust gas outflow side thereof; and a porous partition wall separating the inflow-side cell and the outflow-side cell from each another, wherein the first catalyst portion is formed on a predetermined region of a surface on an inflow-side cell side of the partition wall, the predetermined region extending from an end on an exhaust gas inflow side of the partition wall along the exhaust gas flow direction, wherein the second catalyst portion is formed on a predetermined region of a surface on an outflow-side cell side of the partition wall, the predetermined region extending from an end on an exhaust gas outflow side of the partition wall along a direction opposite to the exhaust gas flow direction, wherein part of the predetermined region of the surface on the inflow-side cell side is covered with the first catalyst portion, whereas remaining part of the predetermined region of the surface on the inflow-side cell side is exposed without being covered with the first catalyst portion, whereby the surface of the first catalyst portion and the remaining part of the predetermined region together form a first uneven surface, wherein part of the predetermined region of the surface on the outflow-side cell side is covered with the second catalyst portion, whereas remaining part of the predetermined region of the surface on the outflow-side cell side is exposed without being covered with the second catalyst portion, whereby the surface of the second catalyst portion and the remaining part of the predetermined region together form a second uneven surface, wherein the first catalyst portion satisfies the following expressions (11) and (12):

$$0.20 \leq R_{11} \leq 0.80 \quad (11)$$

$$0.30 \leq R_{12} \leq 0.85 \quad (12)$$

wherein $R_{11}$ represents a ratio of an area of the part covered with the first catalyst portion to an area of the predetermined region of the surface on the inflow-side cell side, and $R_{12}$ represents a ratio of a surface roughness of the first uneven surface to a surface roughness of the predetermined region of the surface on the inflow-side cell side, and wherein the second catalyst portion satisfies the following expressions (21) and (22):

$$0.20 \leq R_{21} \leq 0.80 \quad (21)$$

$$0.30 \leq R_{22} \leq 0.85 \quad (22)$$

wherein $R_{21}$ represents a ratio of an area of the part covered with the second catalyst portion to an area of the predetermined region of the surface on the outflow-side cell side, and $R_{22}$ represents a ratio of a surface roughness of the second uneven surface to a surface roughness of the predetermined region of the surface on the outflow-side cell side.

2. The exhaust gas purification catalyst according to claim 1, wherein the first catalyst portion satisfies the following expression (13):

$$0.060 \leq R_{13} \leq 0.55 \quad (13)$$

wherein $R_{13}$ represents a value obtained by multiplying $R_{11}$ by $R_{12}$, and $R_{11}$ and $R_{12}$ have the same meanings as above, and wherein the second catalyst portion satisfies the following expression (23):

$$0.060 \leq R_{23} \leq 0.55 \quad (23)$$

wherein $R_{23}$ represents a value obtained by multiplying $R_{21}$ by $R_{22}$, and $R_{21}$ and $R_{22}$ have the same meanings as above.

3. The exhaust gas purification catalyst according to claim 1, wherein the exhaust gas purification catalyst comprises both the first catalyst portion and the second catalyst portion.

4. The exhaust gas purification catalyst according to claim 1, wherein a ratio of a total length of a length of the predetermined region of the surface on the inflow-side cell side and a length of the predetermined region of the surface on the outflow-side cell side to a length of the substrate is 0.30 or more and 1.8 or less.

5. The exhaust gas purification catalyst according to claim 1, wherein the first catalyst portion and the second catalyst portion each independently comprise at least one catalytically-active component selected from platinum element (Pt), palladium element (Pd) and rhodium element (Rh).

* * * * *